US012499913B2

(12) United States Patent
Chen et al.

(10) Patent No.: US 12,499,913 B2
(45) Date of Patent: Dec. 16, 2025

(54) DISPLAY METHOD AND APPARATUS, AND READABLE STORAGE MEDIUM

(71) Applicant: Beijing Zitiao Network Technology Co., Ltd., Beijing (CN)

(72) Inventors: Ziyun Chen, Beijing (CN); Yingzhi Zhou, Beijing (CN); Ran Cui, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/542,384

(22) Filed: Dec. 15, 2023

(65) Prior Publication Data
US 2024/0119968 A1 Apr. 11, 2024

Related U.S. Application Data

(63) Continuation of application No. PCT/CN2022/098420, filed on Jun. 13, 2022.

(30) Foreign Application Priority Data

Jun. 17, 2021 (CN) .......................... 202110674014.1

(51) Int. Cl.
G11B 27/031 (2006.01)

(52) U.S. Cl.
CPC ................................ *G11B 27/031* (2013.01)

(58) Field of Classification Search
CPC ..... G11B 27/031; G11B 27/34; G06F 16/735; G06F 3/04817; G06F 3/0482;
(Continued)

(56) References Cited

U.S. PATENT DOCUMENTS

2008/0263467 A1* 10/2008 Wilkins ................ G06F 3/0484
715/765
2011/0276881 A1 11/2011 Keng et al.
(Continued)

FOREIGN PATENT DOCUMENTS

CN 104349175 A 2/2015
CN 105141972 A * 12/2015 ........... H04N 21/234
(Continued)

OTHER PUBLICATIONS

English Translation of Chinese Publication CN105141972 (Year: 2015).*

(Continued)

*Primary Examiner* — Loi H Tran
(74) *Attorney, Agent, or Firm* — Alleman Hall & Tuttle LLP

(57) ABSTRACT

The present disclosure relates to a display method and apparatus, and a readable storage medium. The method includes: receiving a user operation on an information display entry of a first editing template, the first editing template being configured to edit a first multimedia material into a second multimedia material according to a target editing mode adopted by the first editing template; and displaying an information display page of the first editing template in response to the user operation on the information display entry of the first editing template, the information display page being configured to display indication information of the target editing mode.

17 Claims, 27 Drawing Sheets

(58) Field of Classification Search
CPC ............. G06F 3/04842; G06F 3/04845; G06F 3/04847; G06F 3/04883; G06F 3/0486; G06F 3/0481; G06F 3/0485; G06F 9/451; H04N 21/44016; H04N 21/44008; H04N 21/845; H04N 21/8545
USPC ........................................................ 386/278
See application file for complete search history.

(56) References Cited

U.S. PATENT DOCUMENTS

| | | | | |
|---|---|---|---|---|
| 2021/0005223 | A1* | 1/2021 | Wang | G06F 3/0482 |
| 2021/0026886 | A1* | 1/2021 | Song | G06F 16/7867 |
| 2021/0195284 | A1 | 6/2021 | Song | |
| 2022/0005508 | A1* | 1/2022 | Huang | G11B 27/031 |
| 2023/0368817 | A1 | 11/2023 | Mo | |

FOREIGN PATENT DOCUMENTS

| | | | | |
|---|---|---|---|---|
| CN | 108280128 | A | 7/2018 | |
| CN | 108668164 | A | 10/2018 | |
| CN | 110246523 | A | 9/2019 | |
| CN | 305633392 | S | 3/2020 | |
| CN | 111105819 | A | 5/2020 | |
| CN | 111243632 | A | 6/2020 | |
| CN | 112422831 | A | 2/2021 | |
| CN | 112911379 | A | 6/2021 | |
| JP | 2001155175 | A | 6/2001 | |
| JP | 2006277065 | A | 10/2006 | |
| JP | 2009527135 | A | 7/2009 | |
| WO | WO-2007082167 | A2 * | 7/2007 | G06F 16/78 |
| WO | WO-2022126664 | A1 * | 6/2022 | |

OTHER PUBLICATIONS

English Translation of WIPO Publication WO 2022126664 for PCT CN2020137795 Filing Date Dec. 18, 2020 (Year: 2022).*
English Translation of Chinese Publication CN112073649 Dec. 2020 (Year: 2020).*
English Translation of Chinese Publication CN112379805 Feb. 2021 (Year: 2021).*
ISA China National Intellectual Property Administration, International Search Report Issued in Application No. PCT/CN2022/098420, Aug. 24, 2022, WIPO, 6 pages.
ISA China National Intellectual Property Administration, Written Opinion Issued in Application No. PCT/CN2022/098420, Aug. 24, 2022, WIPO, 6 pages.
China National Intellectual Property Administration, Office Action Issued in Application No. 202110674014.1, Oct. 14, 2024, 16 pages.
European Patent Office, Extended European Search Report Issued in Application No. 22824160.0, Sep. 23, 2024, 8 pages.
Communication pursuant to Rules 70(2) and 70a(2) EPC for European Application No. 22824160.0, mailed Oct. 11, 2024, 1 page.
Japan Patent Office, Notice of Reasons for Refusal for Japanese Patent Application No. 2023-577997, mailed on Mar. 18, 2025, 25 pages.
China National Intellectual Property Administration, Rejection Decision for Chinese Application No. 202110674014.1, mailed Apr. 28, 2025, 14 Pages.
European Patent Office, Office Action Issued in Application No. 22824160.0, Jul. 4, 2025, 9 pages.

* cited by examiner

DISPLAY METHOD AND APPARATUS, AND READABLE STORAGE MEDIUM

CROSS-REFERENCE TO RELATED APPLICATIONS

The present application is a continuation of International application No. PCT/CN2022/098420 filed on Jun. 13, 2022, which is based on and claims priority of China Patent Application No. 202110674014.1, filed on Jun. 17, 2021, the disclosures of which are incorporated by reference herein in their entireties.

TECHNICAL FIELD

The present disclosure relates to a display method, an apparatus, and a readable storage medium.

BACKGROUND

With the continuous development of Internet technology, a user often chooses to create a video using an application (APP). APP usually provides rich editing templates and a variety of editing materials, a user can utilize the editing templates and a variety of editing materials provided by APP for video production.

SUMMARY

In a first aspect, the present disclosure provides a display method, comprising: receiving a user operation on an information display entry of a first editing template, wherein the first editing template is configured to edit a first multimedia material into a second multimedia material according to a target editing mode, and the target editing mode is an editing mode adopted by the first editing template; and displaying an information display page of the first editing template in response to the user operation on the information display entry, wherein the information display page is configured to display indication information of the target editing mode.

In some embodiments, the receiving of the user operation on the information display entry of the first editing template comprises: displaying or playing a target template video, wherein the target template video is a third multimedia material conforming to the target editing mode; and receiving the user operation on the information display entry of the target template video.

In some embodiments, the receiving of the user operation on the information display entry of the first editing template comprises: receiving the user operation on the information display entry in a video playback page corresponding to a target template video.

In some embodiments, the receiving of the user operation on the information display entry of the first editing template comprises: displaying a video information page corresponding to a target template video; and receiving the user operation on an icon corresponding to the information display entry in the video information page.

In some embodiments, the method further comprises: receiving a user operation on a favorite control corresponding to a target material in the information display page; and adding the target material to a favorite list in response to the user operation on the favorite control.

In some embodiments, the method further comprises: receiving a user operation on a search control corresponding to a target material in the information display page; and obtaining and displaying a second editing template in response to the user operation on the search control, wherein the second editing template is configured to indicate editing according to the target material.

In some embodiments, the obtaining and displaying of the second editing template in response to the user operation on the search control comprises: sending a search request to a server device in response to the user operation on the search control, wherein the search request is configured to request acquisition of the second editing template which utilizes the target material; and receiving and displaying the second editing template sent by the server device.

In some embodiments, the method further comprises: receiving a user operation on a use control corresponding to a target material in the information display page; and in response to the user operation on the use control, displaying a video editing page corresponding to a target editing project, wherein the target material is added to the target editing project.

It should be noted that "target material" can be one or more of the editing materials comprised in the target editing mode adopted by the first editing template.

In some embodiments, in the information display page, the target editing mode is displayed according to an editing mode category in the information display page.

In some embodiments, the target editing mode comprises one or more of: music, a sticker, a special font effect, a special effect, a filter, or an inspiration source.

In some embodiments, the method further comprises: displaying a setting page; receiving an activation operation on a template information display function control in the setting page; and configuring the information display entry corresponding to the first editing template for the first editing template in response to the activation operation on the template information display function control.

In a second aspect, an embodiment of the present disclosure provides a display apparatus, comprising: an acquisition module configured to receive a user operation on an information display entry of a first editing template, wherein the first editing template is configured to edit a first multimedia material into a second multimedia material according to a target editing mode, wherein the target editing mode is an editing mode adopted by the first editing template; and a processing module configured to control a display module to display an information display page of the first editing template according to the user operation on the information display entry, wherein the information display page is configured to display indication information of the target editing mode.

In a third aspect, an embodiment of the present disclosure provides an electronic device, comprising: a memory, a processor and computer program instructions, wherein: the memory is configured to store the computer program instructions, and the processor is configured to execute the computer program instructions to implement the method according to the first aspect.

In a fourth aspect, an embodiment of the present disclosure provides a readable storage medium, comprising: a program that, when executed by at least one processor of an electronic device, implements the method according to the first aspect.

In a fifth aspect, an embodiment of the present disclosure provides a computer program product that, when running on an electronic device, causes the electronic device to perform the method according to the first aspect.

In a sixth aspect, an embodiment of the present disclosure provides a computer program, comprising: instructions that, when executed by a processor, cause the processor to perform the method according to the first aspect.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present disclosure or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

In order to better understand the above objects, features and advantages of the present disclosure, the solution of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

The inventors of the present disclosure found that a user may not be able to quickly understand the detailed information of an editing template adopted in APP in the related art.

In view of this, an embodiment of the present disclosure provides a display method.

Figure 1:
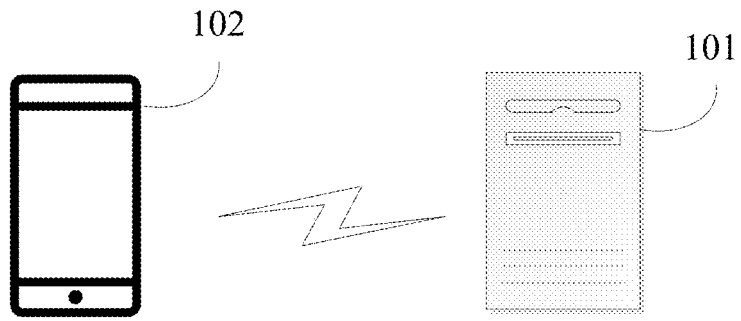
FIG. 1 is a schematic diagram showing an application scenario of a display method provided by an embodiment of the present disclosure.

FIG. 1 is a schematic diagram showing an application scenario of a display method provided by an embodiment of the present disclosure. As shown in FIG. 1, the scenario comprises: a server device 101 and an electronic device 102. The server device 101 can be connected to the electronic device 102 through a wired or wireless network connection.

The server device 101 can be implemented by any software and/or hardware means. For example, the server device 101 may be a server, which may be an independent server, a server cluster consisting of multiple independent servers, or a cloud server. The server device 101 may also be a software program that, when executed by at least one processor of a server, implement the technical solution of the display method carried out by a server device in the embodiments of the present disclosure. In practical applications, the server device 101 can interact with one or more electronic devices 102 simultaneously, sending the same or different data to the electronic devices.

The electronic device 102 can be implemented by any software and/or hardware means. For example, the electronic device 102 may be, but is not limited to, a laptop, a desktop, a smartphone, a portable electronic device, a wearable device, a personal digital assistant (PDA), or the like. The specific type of electronic device is not specifically limited in the embodiments of the present disclosure. The electronic device 102 may also have a software program installed thereon that, when executed by at least one processor of the electronic device 102, causes the electronic device 102 to perform the display method provided by the embodiments of the present disclosure.

FIG. 1 illustrates a scenario where one server device interacts with one electronic device. In practical application scenarios, a server device can interact with more than one electronic device in parallel.

The display method provided by the present disclosure will be described below with reference to specific embodiments.

Figure 2:
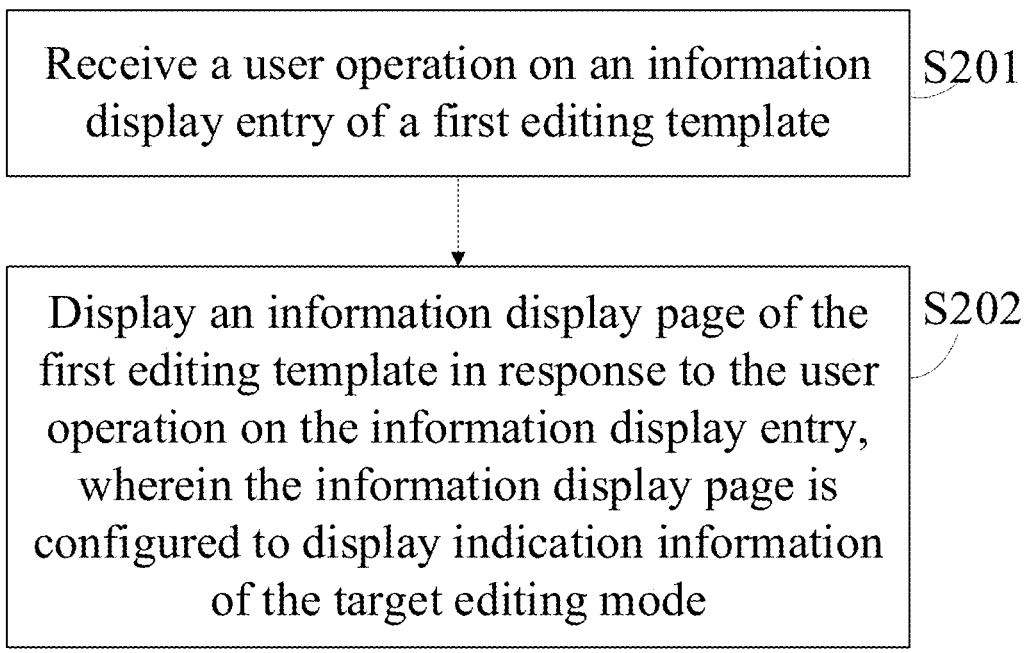
FIG. 2 is a flowchart of a display method provided by an embodiment of the present disclosure.

FIG. 2 is a flowchart of a display method provided by an embodiment of the present disclosure. In order to provide a clear introduction to the display method provided by the present disclosure, the following description is given with an example where the execution subject is a mobile phone with an application program (hereinafter referred to as application A) installed thereon.

As shown in FIG. 2, the method of the embodiment comprises steps S201 to S202.

In step S201, a user operation on an information display entry of a first editing template is received.

The first editing template is configured to edit a first multimedia material into a second multimedia material according to a target editing mode, wherein the target editing mode is an editing mode adopted by the first editing template.

In this solution, application A provides a function of aggregating and displaying detailed information of the target editing mode adopted by the first editing template. On this basis, application A can provide an information display entry on a user interface that can be operated by a user. When application A detects a user operation on the information display entry, it displays an information display page corresponding to the first editing template on the user interface, wherein the information display page is configured to aggregate and display indication information of a target editing mode adopted by the first editing template.

In practical applications, application A usually provides a function of creating a video based on the editing template, as well as a function of recreating a video based on the video created using the editing template. For example, suppose application A provides editing template 1, and user A edits multimedia material a based on editing template 1 to create and publish a first video; when user B uses application A to display or play back the first video, user B can edit multimedia material b in an editing mode adopted by editing template 1 based on an editing entry provided by the first video to create a second video; user C can create a third video by editing multimedia material c in the editing mode adopted by editing template 1 based on an editing entry provided by the second video, and so on. In this way, a large number of videos that follow the editing mode of editing template 1 can be obtained. For all these videos that follow the editing mode adopted by editing template 1, an information display entry of editing template 1 can be provided for a user to view the detailed information of editing template 1.

For the first editing template in step S201, optionally, the information display entry can be provided on a video playback page of the target template video; alternatively, the information display entry can also be provided in a video information page of the target template video. The "target template video" here can be a multimedia material that conforms to a target editing mode adopted by the first editing template.

In one possible implementation, the information display entry is provided in a video playback page:

in the case where the information display entry is provided in the video playback page of the target template video, application A first displays a video playback page, wherein the video playback page is configured to display or play the target template video; when application A detects a user operation (such as a click operation) on the information display entry in the video playback page, an instruction for entering the information display page is generated.

In another possible implementation, the information display entry is provided in a video information page:

the video information page can display relevant information of a target template video by category. For example, the video information page can display comment information of the target template video, detailed information of the first editing template adopted by the target template video, and information to guide a user on how to perform video editing, etc. In the video information page, icons can be provided separately for different categories of information. When a user clicks on an icon, information corresponding to the icon is displayed on the video information page.

In the case where the information display entry is provided on the video information page of the target template video, when application A detects a user operation (such as a clicking operation) on the video information display entry in the video playback page while displaying or playing the target template video, application A displays a video information page corresponding to the target template video on the user interface of the electronic device, wherein the video information page comprises an icon corresponding to the information display entry of the first editing template; next, when application A detects a user operation (such as a click operation) on the icon corresponding to the information display entry in the video information page, an instruction for entering the information display page is generated.

Of course, the information display entry can also be provided on other pages corresponding to the target template video, which is not limited in the embodiments of the present disclosure.

In S202, an information display page of the first editing template is displayed in response to the user operation on the is configured to display indication information of the target editing mode.

Heretofore, an embodiment of the present disclosure provides a display method. The method comprises: receiving a user operation on an information display entry of a first editing template, wherein the first editing template is configured to edit a first multimedia material into a second multimedia material according to a target editing mode adopted by the first editing template; and displaying an information display page of the first editing template in response to the user operation on the information display entry of the first editing template, wherein the information display page is configured to display indication information of the target editing mode. This method aggregates and displays the indication information of various editing modes used by the first editing template by providing a template information display function to, thereby satisfying the requirement of the user to quickly and comprehensively understand the detailed information of the first editing template. In addition, by enabling users to fully understand the detailed information of the first editing template, it can also increase their motivation for using the first editing template to create videos.

The target editing mode adopted by the first editing template can comprise one or more of: music, a sticker, a special font effect, a special effect, a filter, or an inspiration source. One or more editing materials can be used for each target editing mode.

For example, assume that the first editing template adopts two types of target editing modes, music and sticker. For music, assume that multiple different pieces of music are used by the first editing template, and for stickers, assume that multiple different stickers are used by the first editing template, the information display page corresponding to the first editing template displays indication information of the multiple different pieces of music and indication information of the multiple different stickers, respectively.

In one possible implementation method, in the information display page, the editing materials can be displayed sequentially in accordance with the chronological order in which the editing materials comprised in each editing mode are added to the first editing template.

In another possible implementation method, in the information display page, the target editing mode adopted by the first editing template is displayed according to categories. For example, in an information display page, each target editing mode corresponds to a display area, wherein in the display area, editing materials used for the corresponding category are displayed.

Optionally, the display area corresponding to each target editing mode in the information display page can be ordered according to priority of the editing mode. The display area corresponding to each target editing mode comprises: a sub-display area corresponding to each editing material adopted by the target editing mode, wherein the sub-display area is configured to display indication information of a corresponding editing material.

For example, assume that the first editing template adopts six target editing modes of music, a sticker, a special font effect, a special effect, a filter, and an inspiration source. The priority of the target editing modes in descending order may be: the music>the sticker>the special font effect>the special effect>the filter>the inspiration source. As an anther example, the priority of the target editing modes in descending order may be: the music>the sticker>the special font effect>the special effect=the filter>the inspiration source. It should be understood that the priority of the editing modes listed here in descending order is only an example, and can be set flexibly in practice.

Optionally, for different editing materials in the same target editing mode, the position of each editing material in the display area of that target editing mode can be randomly determined.

Optionally, for different editing materials in the same target editing mode, the position of each editing material in the display area of that target editing mode can be determined according to the chronological order of the editing materials added by the first editing template. For example, if four different pieces of music materials are used in the first editing template, and the chronological order of those four music materials added by the first editing template is: Music Material 1>Music Material 2>Music Material 3>Music Material 4, then in the information display page, the display area corresponding to music (editing mode) comprises four sub-display areas, wherein a sub-display area 1 corresponding to music material 1 is located above a sub-display area 2 corresponding to music material 2; the sub-display area 2 corresponding to music material 2 is located above a sub-display area 3 corresponding to music material 3; and the sub-display area 3 corresponding to music material 3 is located above a sub-display area 4 corresponding to music material 4.

In a situation that the target editing modes used by the first editing template are displayed in the information display page in categories, each editing mode will be introduced below.

1. Music

In the information display page, the display area corresponding to music can comprise: a sub-display area corresponding to a music material, wherein the sub-display area can display music information of the music material. The music information can comprise, but is not limited to: song name, singer name, song duration, and song cover, etc. The sub-display area corresponding to a music material can also comprise some controls, such as a playback control, a favorite control, a use control, a search control, a web link entry, or the like.

Optionally, if multiple pieces of music are used in the first editing template, application A can determine the position of each sub-display area on the information display page according to the chronological order in which these pieces of music are added by the first editing template.

In practical applications, if many pieces of music are used in the target template video, it is possible to display only a portion of these pieces of music used in the target template video, i.e., in the information display page, a portion of the music materials can be displayed while the other music materials are hidden.

For example, if 4 pieces of music are used in the target template video, 3 music materials can be displayed on the information display page, while the fourth music material is hidden.

(a) Assume that the sub-display area corresponding to a music material comprises a playback control, if application A detects a user operation on the playback control when the music material is not in the playback state, in response to the user operation on the playback control, application A can play the music. If application A receives a user operation on the playback control for the music from a user when the music material is in the playback state, application A pauses the playback of the music in response to the user operation.

In addition, during the music playback process, application A can display a waveform of the music material and comprises a draggable selection box on the waveform of the music material. A user can select a segment of the music material to be played by operating the selection box (e.g., dragging the selection box).

(b) Assume that the sub-display area corresponding to a music material comprises a favorite control, when application A detects a user operation on the favorite control, application A adds the music material to the favorite list for music in response to the user operation.

(c) Assume that the sub-display area corresponding to a music material comprises a use control, when application A detects a user operation on the use control, application A jumps to a material selection page corresponding to creation of a draft video, the material selection page corresponding to the creation of the draft video comprising a plurality of selectable multimedia materials.

(d) Assume that the sub-display area corresponding to a music material comprises a search control, when application A detects a user operation on the search control, in response to the user operation on the search control, application A obtains another multimedia material using that music material.

(e) Assume that the sub-display area corresponding to a music material comprises a web link entry, when application A detects a user operation on the web link entry, in response to the user operation on the web link entry, application A jumps to a webpage pointed to by the web link entry.

2. Sticker

In the information display page, the display area corresponding to a sticker can comprise: a sub-display area corresponding to a sticker material, wherein the sub-display area can display information of a sticker material. The sub-display area corresponding to a sticker material can also comprise: a favorite control, a use control, etc. corresponding to the sticker material. If the sticker material is a dynamic sticker, the sticker material can be displayed synchronously and dynamically in the sub-display area corresponding to the sticker material.

Optionally, if multiple sticker materials are used in the first editing template, a position of each sub-display area on the information display page can be determined according to the chronological order in which the sticker materials are added by the first editing template.

Optionally, in the information display page, the sticker can be displayed in a form of a full display, i.e., all the stickers used in the first editing template are displayed. Of course, a part of the sticker materials is displayed, the other sticker materials are hidden.

(a) Assume that the sub-display area corresponding to a sticker material comprises a favorite control, when application A detects a user operation on the favorite control, the sticker material is added to a sticker favorite list in response to the user operation.

(b) Assume that the sub-display area corresponding to a sticker material comprises a use control, when application A detects a user operation on the use control, application A creates a target editing project and displays a video editing page corresponding to the editing project, wherein the sticker material has been added to the target editing project.

3. Special Font Effect (Also Referred to as a Text Effect)

In the information display page, the display area corresponding to the special font effect can comprise: a sub-display area corresponding to a special font material, wherein the special font material can display cover information of the special font material. The sub-display areal can further comprises some controls such as a favorite control, a use control or the like. If a special font material is a dynamic material, the special font material can be dynamically displayed in its corresponding sub-display area.

Optionally, if multiple special font materials are used in the first editing template, a position of each sub-display area on the information display page can be determined according to the chronological order in which the special font materials are added by the first editing template.

In the solution, the special font material may comprise one or more of: a special font (a text character), an animation, or a bubble. On the information display page, the special font materials can be further sorted according to their priority. For example, the priority of the special font materials in descending order can be, but is not limited to: the special font>the animation>the bubble.

In practical applications, in the information display page, the special font material can be displayed in a form of a full display, i.e., all special font materials used in the first editing template are displayed. Of course, a part of the special font materials can be also displayed, and the other special font materials are hidden.

(a) Assume that the sub-display area corresponding to a special font material comprises a favorite control, when application A detects a user operation on the favorite control, application A adds the special font material to a special font effect favorite list in response to the user operation.

(b) Assume that the sub-display area corresponding to a special font material comprises a use control, when application A detects a user operation on the use control, in response to the user operation, application A creates a target editing project and displays a video editing page corresponding to the editing project, wherein the corresponding special font material has been added to the target editing project.

4. Special Effect

In the information display page, the display area corresponding to the special effect can comprise: a sub-display area corresponding to the special effect material, wherein the sub-display area can display cover information or the like of the special effect material. The sub-display area can further comprises some controls such as a favorite control, a use control or the like. If the special effect material is a dynamic material, the special effect material can be displayed dynamically in the sub-display area corresponding to the special effect material.

Optionally, if multiple special effect materials are used in the first editing template, a position of each sub-display area on the information display page can be determined according to the chronological order in which the special effect materials are added by the first editing template.

Optionally, in the information display page, the special effect can be displayed in a form of a full display, i.e., all special effect materials used in the first editing template are displayed. Of course, a part of the special effect materials can be also displayed, and the other special effect materials are hidden.

(a) Assume that the sub-display area corresponding to a special effect material comprises a favorite control, when application A detects a user operation on the favorite control, application A adds a corresponding special effect material to a special effect favorite list in response to the user operation.

(b) Assume that the sub-display area corresponding to a special effect material comprises a use control, when application A detects a user operation on the use control, in response to the user operation, application A jumps to a material selection page corresponding to creation of a draft video. The material selection page corresponding to the creation of the draft video comprises: a plurality of selectable multimedia materials.

5. Filter

In the information display page, the display area corresponding to the filter can comprise: a sub-display area corresponding to the filter material, wherein the sub-display area can display cover image of a filter material and a name of the filter material. The sub-display area can further comprise some controls such as a favorite control, a use control or the like. If multiple filter materials are used in the first editing template, a position of each sub-display area on the information display page can be determined according to the chronological order in which the filter materials are added by the first editing template.

Optionally, in the information display page, the filter can be displayed in a form of a full display, i.e., all filter materials used in the first editing template are displayed. Of course, a part of the filter materials can be also displayed, and the other filter materials are hidden.

(a) Assume that the sub-display area corresponding to a filter material comprises a favorite control, when application A detects a user operation on the favorite control, application A adds a corresponding filter material to a special effect favorite list in response to the user operation.

(b) Assume that the sub-display area corresponding to a filter material comprises a use control, when application A detects a user operation on the use control, in response to the user operation, application A jumps to a material selection page corresponding to creation of a draft video. The material selection page corresponding to the creation of the draft video comprises: a plurality of selectable multimedia materials.

6. Inspiration Source

In the information display page, the display area corresponding to the inspiration source can comprise an inspiration source link entry, wherein a name of the inspiration source link entry may be an inspiration source link title.

When application A detects a user operation on the inspiration source link entry, application A can jump to a H5 page corresponding to the inspiration source link.

In this embodiment, by obtaining a user operation on an information display entry for the first editing template and in response to the user operation on the information display entry for the first editing template, an information display page of the first editing template is displayed. By providing a template information display function, indication information of various target editing modes adopted by the first editing template is aggregated and displayed, thereby satisfying the requirement of users to quickly and comprehensively understand the detailed information of the first editing template. In addition, in the information display page corresponding to the target template video, basic information of each editing material is displayed in a sub-display area corresponding to the each editing material, thereby facilitating users to have a clear understanding of the detailed content of each editing material. In addition, the sub-display area also comprises a collection of functions, such as a favorite function, a use function, a search function, a web page link function, etc., to facilitate users to perform related operations on their favorite editing materials according to their needs, thereby increasing the flexibility and motivation for users to create videos using these materials.

Based on the above description, a detailed introduction to the display method provided in an embodiment of the present disclosure will be given with reference to the accompanying drawings, and a specific application scenario as an example. For the sake of illustration, in the example below, the electronic device is a mobile phone with an application (App 1) installed.

Figure 3:
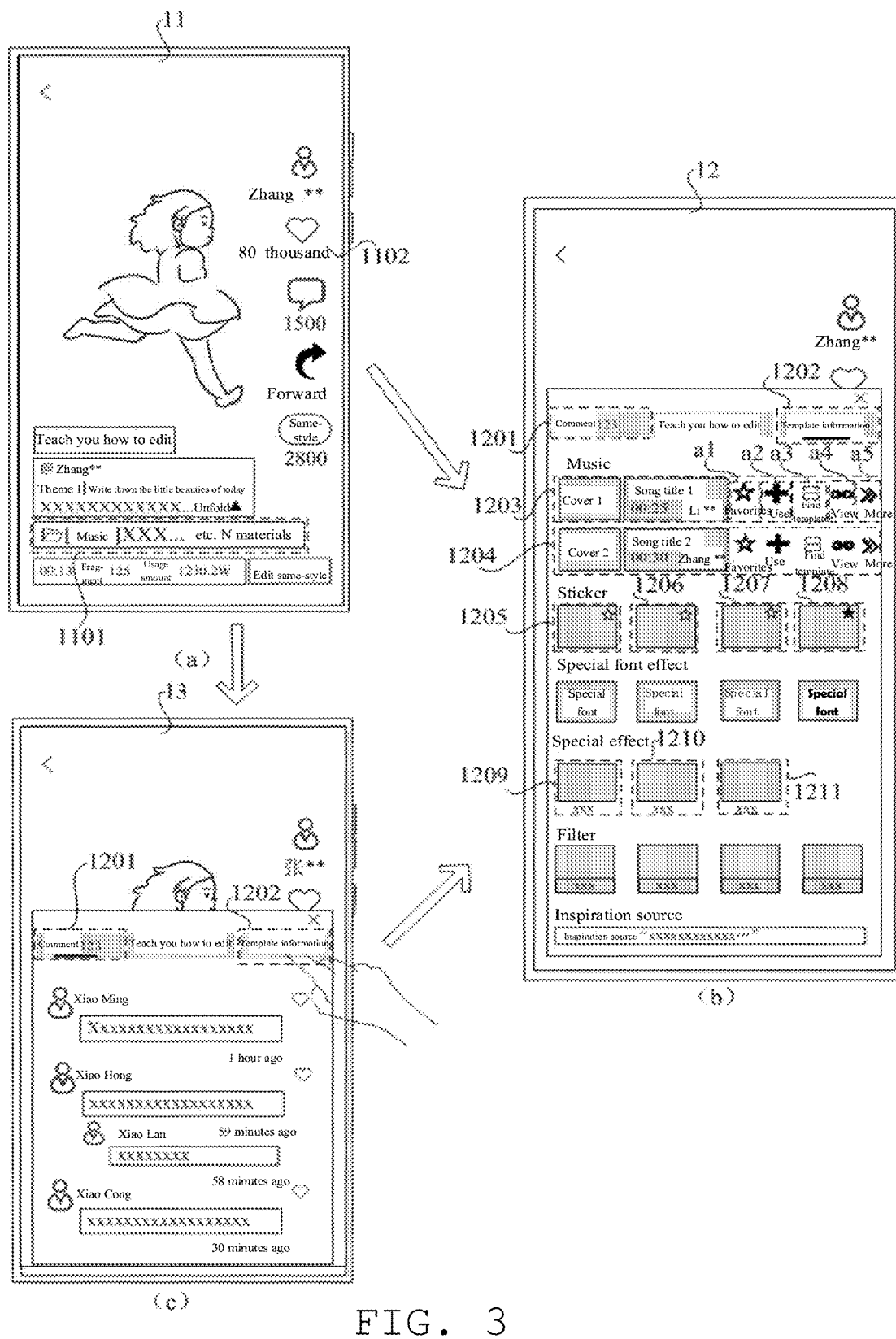
FIG. 3 is a schematic diagrams of a human-computer interaction interface provided by an embodiment of the present disclosure.

FIG. 3 is a schematic diagrams of a human-computer interaction interface provided by an embodiment of the present disclosure. FIG. 3 illustrates two ways to enter an information display page.

The first way is to enter the information display page through an information display entry in a video playback page corresponding to a target template video.

Referring to the exemplary user interface 11 shown in FIG. 3(a), the user interface 11 is configured to display a video playback page. The application 1 performs a certain set of functions on the video playback page, such as playing a target template video (a short video). The video playback page comprises an information display entry 1101.

The information display entry 1101 can be named in the form of "material icon+[music]+music title+ etc. N other materials". If music is utilized in the first editing template adopted by the target template video that is currently playing, the display of the music title of the first piece of music can be prioritized in the name of the information display entry; if no music is utilized in the first editing template adopted by the target template video that is currently playing, the information display entry 1101 can be named in the form of "material icon+etc. N materials".

N represents the total number of materials used in the template video that is currently playing.

Figure 11:
FIG. 11 is a schematic diagram of a material icon provided by an embodiment of the present disclosure.

For example, in FIG. 3(a), the name of the information display entry is named in the form of "material icon+[music]+music title+etc. N materials", where the material icon is, for example, the icon shown in FIG. 11, and the music title is "XXX".

When application 1 detects a user operation (such as a click operation) on the information display entry 1101, application 1 exemplarily displays a user interface 12 as shown in FIG. 3(b) on the mobile phone, wherein the user interface 12 is configured to display a video information page. The video information page can comprise multiple icons, for example, the above multiple icons can comprise: an icon 1201 corresponding to a comment page, and an icon 1202 corresponding to an information display page. These icons can be named based on the information of the corresponding pages. For example, icon 1201 can be named in the form of "comments+number of comments", and icon 1202 can be named as "template information".

When a user operates the information display entry 1101 to display the video information page in the user interface 12 shown in FIG. 3(b), the icon 1202 corresponding to the template information page can be localized directly, that is, the information display page is directly displayed in the user interface 12.

In the information display page shown in FIG. 3(b), various target editing modes are displayed in descending order of priority. In the example shown in FIG. 3(b), the descending order of priority of the target editing modes is: the music>the sticker>the special font effect>the special effect>the filter>the inspiration source, and in combination with the chronological order of the editing materials added by the first editing template, a position of the sub-display area corresponding to each editing material in the display area of the target editing mode can be determined.

It should be noted that FIG. 3(b) is intended to provide a clearer explanation of the information display page. In practical applications, due to the size of the display screen of the electronic device, only a portion of the information display page shown in FIG. 3(b) may be displayed, with support for users to view the entire information display page by sliding on the screen.

The second way is to enter the information display page through an icon of an information display entry in a video information page corresponding to a target template video.

For example, the user interface 11 further comprise a control 1102, wherein the control 1102 is configured to enter a video information page. When application 1 detects a user operation (such as a click operation) on the entry 1102 of a video information page, application 1 exemplarily displays a user interface 13 as shown in FIG. 3(c) on the mobile phone, wherein in the user interface 13 as exemplarily shown in FIG. 3(c), an icon 1201 corresponding to a comment page may be localized by default, and a comment page is displayed in the user interface 13.

Then, when application 1 receives an operation (such as a click operation) on the icon 1202 of the information display entry, application 1 may exemplarily display a user interface 12 as shown in FIG. 3(b) on the mobile phone.

It should be understood that the two ways to enter the information display page mentioned above are only examples, and not a limitation to the way of entering the information display page.

A detailed introduction to the display method provided in the present disclosure will be given below with examples of different scenarios, focusing on different target editing modes used in the first editing template.

1. Music

Referring to the information display page shown in FIG. 3(b), two pieces of music materials, namely music 1 and music 2, are utilized in the first editing template, wherein music 1 corresponds to a sub-display area 1203 and music 2 corresponds to a sub-display area 1204. Since music 1 was added earlier than music 2 by the first editing template, the sub-display area 1203 is located above the sub-display area 1204.

The sub-display area 1203 corresponding to music 1 comprises: a favorite control a1, a use control a2, a search control a3, a control a4 corresponding to link, and a control a5.

In practical applications, if more music materials are used in the first editing template, those materials can be arranged from top to bottom according to the chronological order in which the materials were added by the first editing template.

For music, an introduction will be given below with an example in which the favorite control a1, the use control a2, the search control a3, the control a4 corresponding to link, and the control a5 corresponding to music 1 are operated respectively.

(a) Favorite Control a1

The favorite control a1 is configured to add music 1 to the a music favorite list. If music 1 has not been added by the user to the music favorite list, the favorite control a1 is displayed in a first state. When application 1 detects a user operation (such as a click operation) on the favorite control a1, application 1 can exemplarily display a user interface 14 shown in FIG. 4a on the mobile phone. In the user interface 14 shown in FIG. 4a, the favorite control a1 is in a second state, indicating that music 1 has been added to the music favorite list.

Figure 4A:
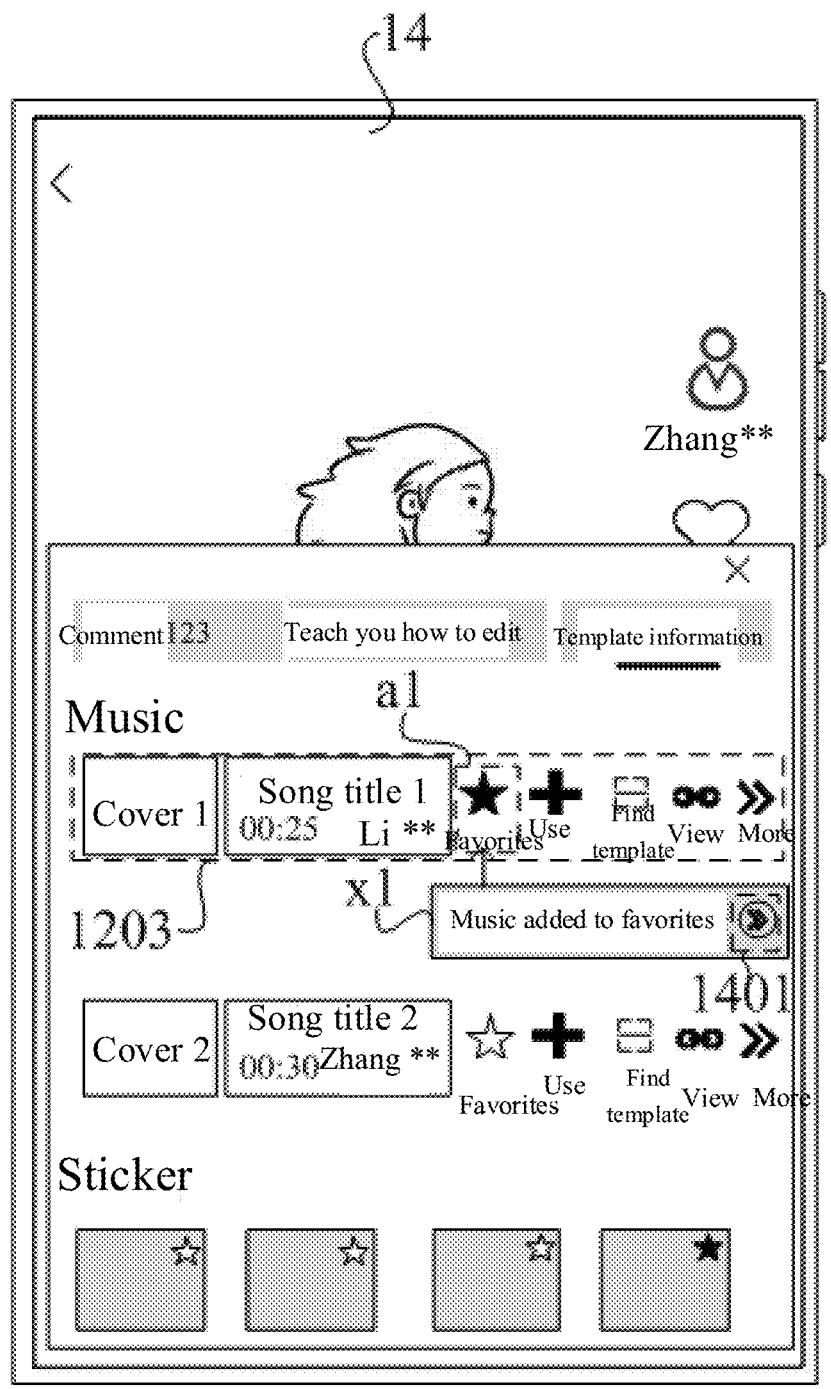
FIGS. 4a to 4f are schematic diagrams of human-computer interaction interfaces provided by another embodiment of the present disclosure.

In some cases, the user interface 14 shown in FIG. 4a may further comprise a window x1, wherein the window x1 is configured to display prompt information that music 1 has been added to the music favorite list. Referring to the user interface 14 shown in FIG. 4*a*, text "music added to favorites" is displayed in window x1.

The window x1 may further comprise: a control 1401 configured to enter a first guide window x2, wherein the first guide window x2 is configured to play a music viewing guide video and display other prompt information. When application 1 detects a user operation (such as a click operation) on the control 1401, application 1 can exemplarily display a user interface 15 shown in FIG. 4*b* on the mobile phone, the user interface 15 shown in FIG. 4*b* comprising the first guide window x2.

Figure 4B:
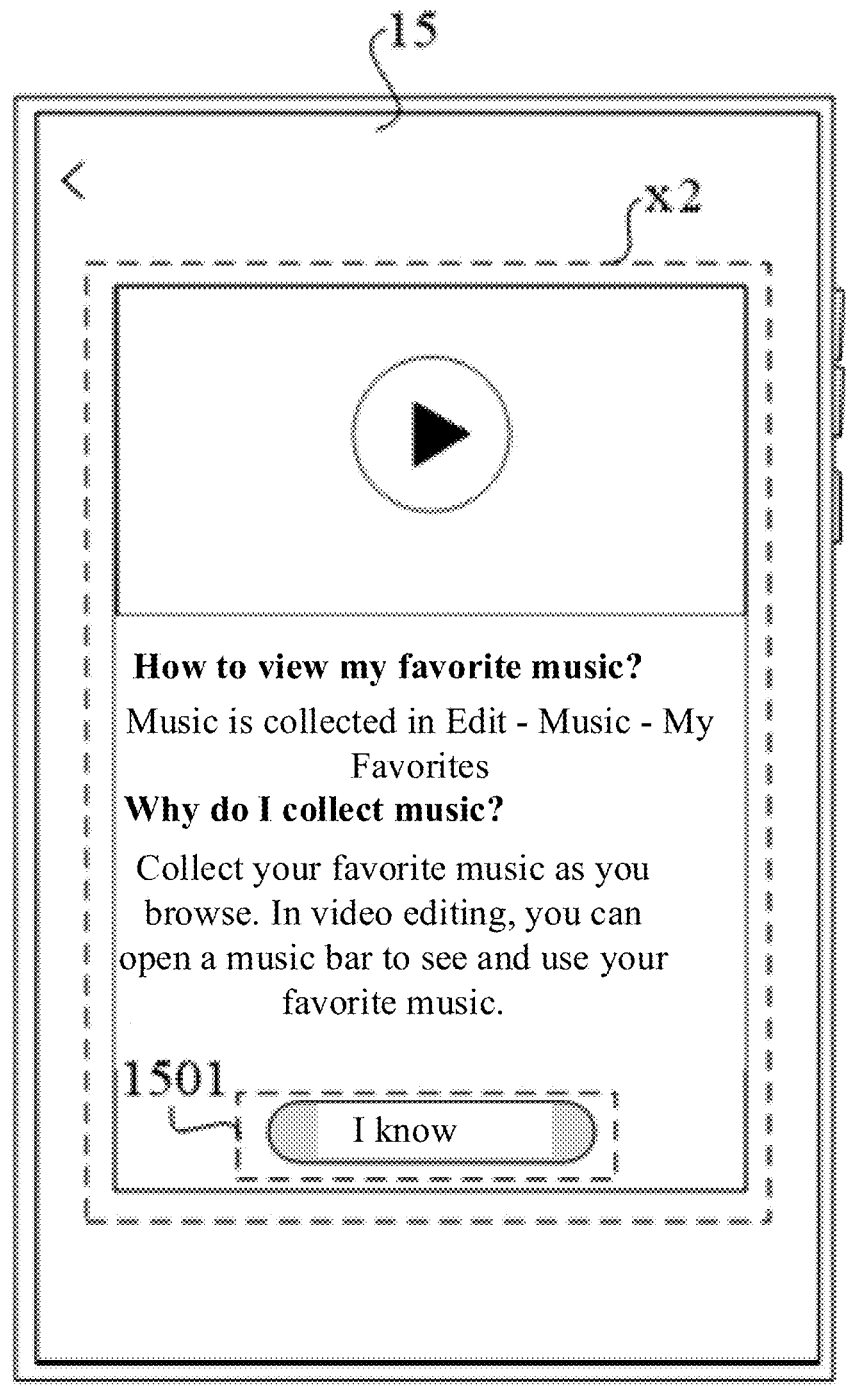

As shown in FIG. 4*b*, the upper portion of the first guide window x2 is configured to play a music viewing guide video. The lower portion of the first guide window x2 is configured to display prompt information such as "How to view my favorite music? Music is collected in Edit—Music—My Favorites; Why do I collect music? Collect your favorite music as you browse. In video editing, you can open a music bar to see and use your favorite music."

In addition, the first guide window x2 also comprises a control 1501, wherein the control 1501 is configured to close the first guide window x2. When application 1 detects an operation (such as a click operation) on the control 1501, application 1 may exemplarily display a user interface 14 as shown in FIG. 4*a* on the mobile phone.

(b) Use Control a2

The use control a2 is configured to create a target editing project based on music 1. When application 1 detects an operation (such as a click operation) on the use control a2, application 1 can exemplarily display a user interface 16 shown in FIG. 4*c* on the mobile phone, wherein the user interface 16 is configured to display a video and/or a photo already captured by the mobile phone, and to provide an entry point for video creation for a selected video and/or photo. An option 1601 and a control 1602 are displayed in the user interface 16. The option 1601 is configured to provide a cover or a photo for displaying a video. The control 1602 is configured to provide an entry to a video editing page.

Figure 4C:
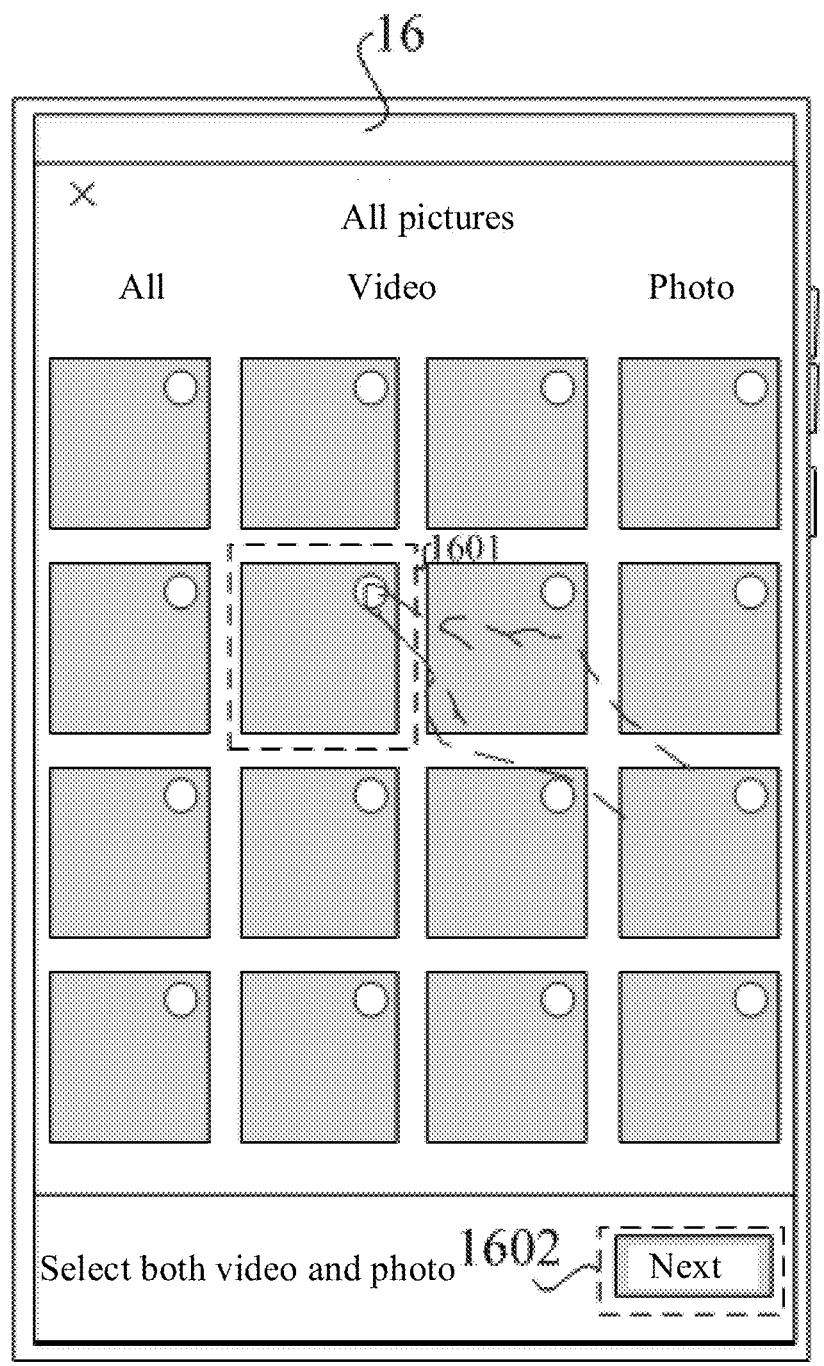

An operation on the option 1601 (such as a click operation) and an operation on the control 1602 (such as a click operation) in the user interface 16 shown in FIG. 4*c* are sequentially detected by application 1. The selected photo and/or video, as well as music 1, are added to the target editing project created by application 1. In addition, application 1 can exemplarily display a user interface 17 shown in FIG. 4*d* on the mobile phone, wherein the user interface 17 is configured to display a video creation page corresponding to the target editing project.

Figure 4D:
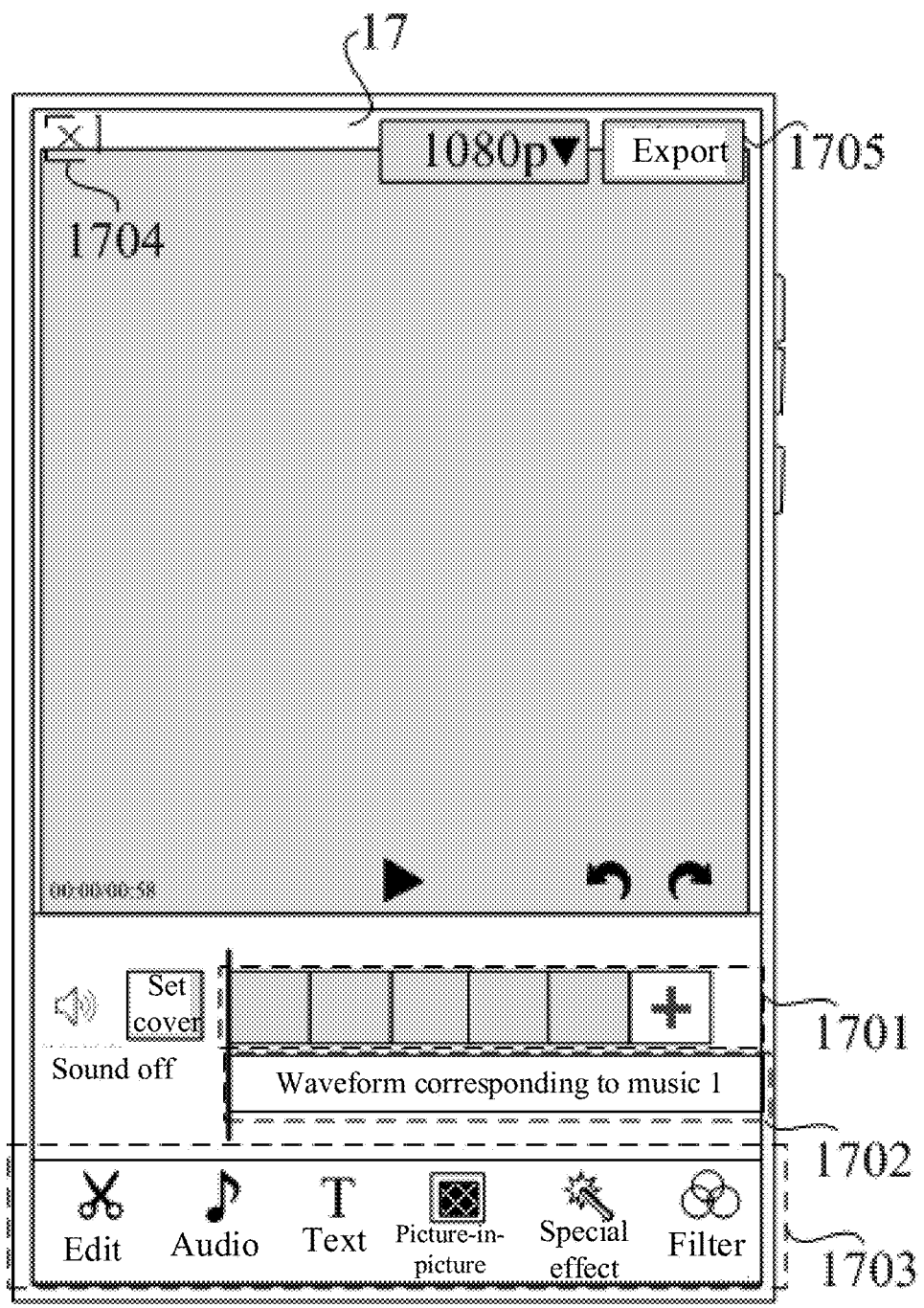

The video creation page shown in FIG. 4*d* comprises an area 1701, an area 1702, an area 1703, a control 1704, and a control 1705.

The area 1701 is configured to display a video frame sequence generated based on the selected video or photo; the area 1702 is configured to display a waveform of music 1; and the area 1703 is configured to display a video editing toolbar.

The control 1704 is configured to close the video editing page. When application 1 receives a user operation (such as a click operation) on the control 1704, application 1 may return to display the user interface 16 as shown exemplarily in FIG. 4*c* on the mobile phone.

The control 1705 is configured to export an edited video. When application 1 receives a user operation (such as a click operation) on the control 1705, application 1 may display a corresponding video export page and save the edited video in a local storage space. The layout and detailed content of the video export page are not limited in the present disclosure.

Of course, the video creation page displayed on the user interface 17 shown in FIG. 4*d* can also comprise other controls, such as a sound control, a playback control, etc., which are not limited in the present disclosure.

(c) Search Control a3

The search control a3 is configured to generate a search task based on music 1. When application 1 detects a user operation (such as a click operation) on the search control a3, application 1 sends a search request to a server device via the mobile phone. The search request can comprise relevant information of music 1, so that the server device can search in a template video library based on the search request. Then, the server device sends data of a third multimedia material (also known as a same-style template video) that meets the search request to the mobile phone. The third multimedia material here is a multimedia material obtained by editing using music 1.

Figure 4E:
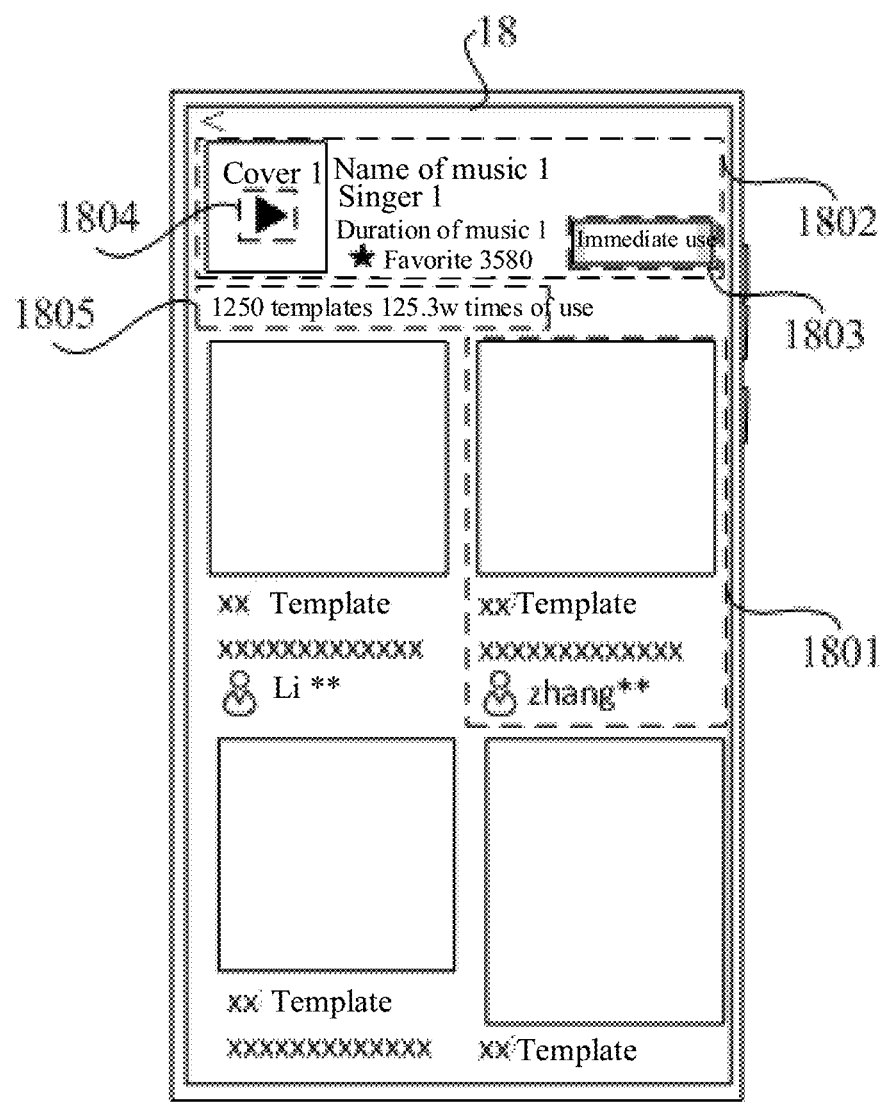

After receiving data of the same-style template video in which music 1 is used, application 1 can exemplarily display a user interface 18 shown in FIG. 4*e* on the mobile phone, wherein the user interface 18 is configured to display the same-style template video in which music 1 is used. If there are multiple same-style template videos in which music 1 is used, each same-style template video can correspond to an area 1801, which is configured to provide relevant information of the same-style template video, such as a cover of the same-style template video, a theme of the same-style template video, an introduction to the same-style template video, the amount of use of the same-style template video, the number of likes the same-style template video has received, and an avatar of the creator of the same-style template video, or the like. When application 1 detects a user operation on an area 1801 of a same-style template video, application 1 can display a video playback page on the mobile phone to play the same-style template video. A size of the area 1801 corresponding to each same-style template video may be the same or different.

The user interface 18 may further comprise an area 1802, wherein the area 1802 is configured to provide information of music 1, such as a cover 1 of music 1, a name of music 1, a duration of music 1, and the number of favorites of music 1.

The area 1802 can also comprise a control 1804 that controls music playback. If the control 1804 is in an unplayed state, application 1 plays music 1 when a user inputs an operation (such as a click operation) on the control 1804. If control 1804 is in a play state, application 1 pauses the playback of music 1 when a user inputs an operation (such as a click operation) on the control 1804.

User interface 18 may further comprise a control 1803. The control 1803 is configured to enter a video creation page based on music 1. For example, when application 1 detects a user-input operation (such as a click operation) on the control 1803, application 1 may exemplarily display a user interface 16 shown in FIG. 4*c* on the mobile phone.

The user interface 18 may further comprise an area 1805, wherein the area 1805 is configured to display relevant information of a template video that have been found based on music 1, such as the number of found same-style template videos and the number of times music 1 has been used to create videos.

The user interface 18 allows users to view more same-style template videos by sliding on the screen.

(d) Control a4 Corresponding to Link

As shown in FIG. 3(b), when application 1 detects an operation (such as a click operation) on the control a4, application 1 can jump to a web page corresponding to the link, and display contents of the web page on the mobile phone.

(e) Control a5

As shown in FIG. 3(b), the control a5 is configured to implement a "More" function.

Specifically, if there are more functions corresponding to music 1, for example, in addition to a favorite, a use, a search, and a link described above, music 1 can also be shared. Controls corresponding to some functions can be displayed in the user Interface 12, and the other controls can be hidden. Therefore, some controls can be hidden or shown using the control a5.

Figure 4F:
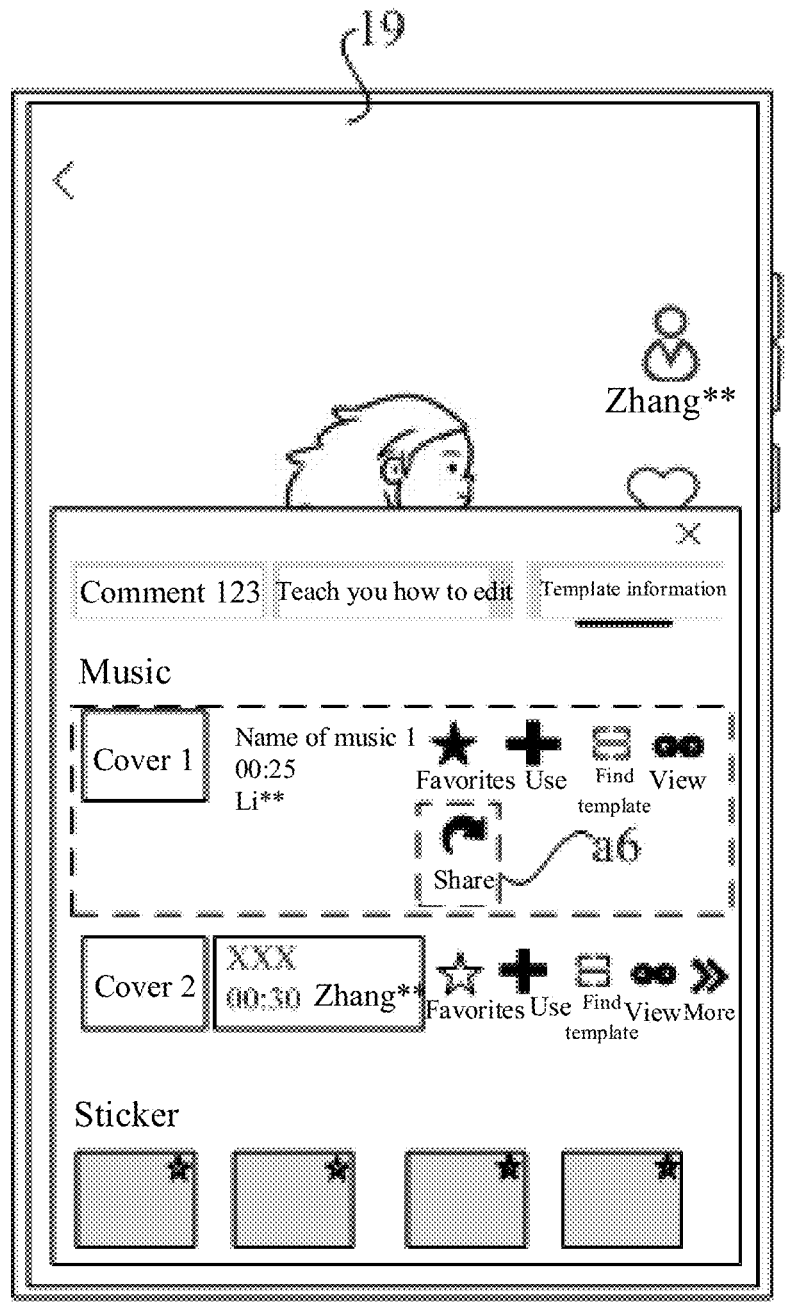

Specifically, when application 1 detects an operation (such as a click operation) on the control a5, application 1 may exemplarily display a user interface 19 as shown in FIG. 4f on the mobile phone.

As shown in FIG. 4f, the user interface 19 displays more controls corresponding to music 1, such as a control a6, wherein the control a6 is configured to share music 1. Of course, in practical applications, more other controls can also be comprised.

The above human-machine interaction interfaces provided in FIGS. 4a to 4f illustrate the scenario of operations on a sub-display area, as well as some controls in the sub-display area, corresponding to music 1 (a target material described above) on the information display page corresponding to a target template video.

An implementation of the individual controls of the user-operated music 2 is similar to an implementation of the individual controls of the user-operated music 1 and will not be repeated herein for the sake of brevity.

2. Sticker

Referring to the information display page shown in FIG. 3(b), four sticker materials, namely sticker 1 to sticker 4, are utilized by the first editing template, wherein the sticker 1 corresponds to a sub-display area 1205, the sticker 2 corresponds to a sub-display area 1206, the sticker 3 corresponds to a sub-display area 1207, and the sticker 4 corresponds to a sub-display area 1208. Due to the chronological order in which the various sticker materials are added by the first editing template, positions of sub-display areas 1205 to 1208 are arranged from left to right on the information display page as shown in FIG. 3(b).

If more sticker materials are used by the first editing template, these sticker materials can be arranged in the information display page from left to right or from top to bottom in the chronological order in which these sticker materials are added by the first editing template.

The sub-display area corresponding to each sticker material is configured to provide relevant information of the sticker, such as cover information of the sticker material, and a favorite control b1. If a current sticker material has been added to the sticker favorite list, in the sub-display area corresponding to the sticker material, the favorite control b1 may be set to an "in Favorites" state. A sticker material that has not been added to the Favorites may be in a "Not in Favorites" state.

As shown in FIG. 3(b), since none of sticker 1 to sticker 3 has been added to the favorite, states of the favorite controls b1 corresponding to the sticker 1 to the sticker 3 are a first state; and since the sticker 4 has been added to the favorite, a state of the favorite control b1 corresponding to sticker 4 is a second state.

The first state is the "Not in Favorites" state; the second state is the "In Favorites" state.

Figure 5A:
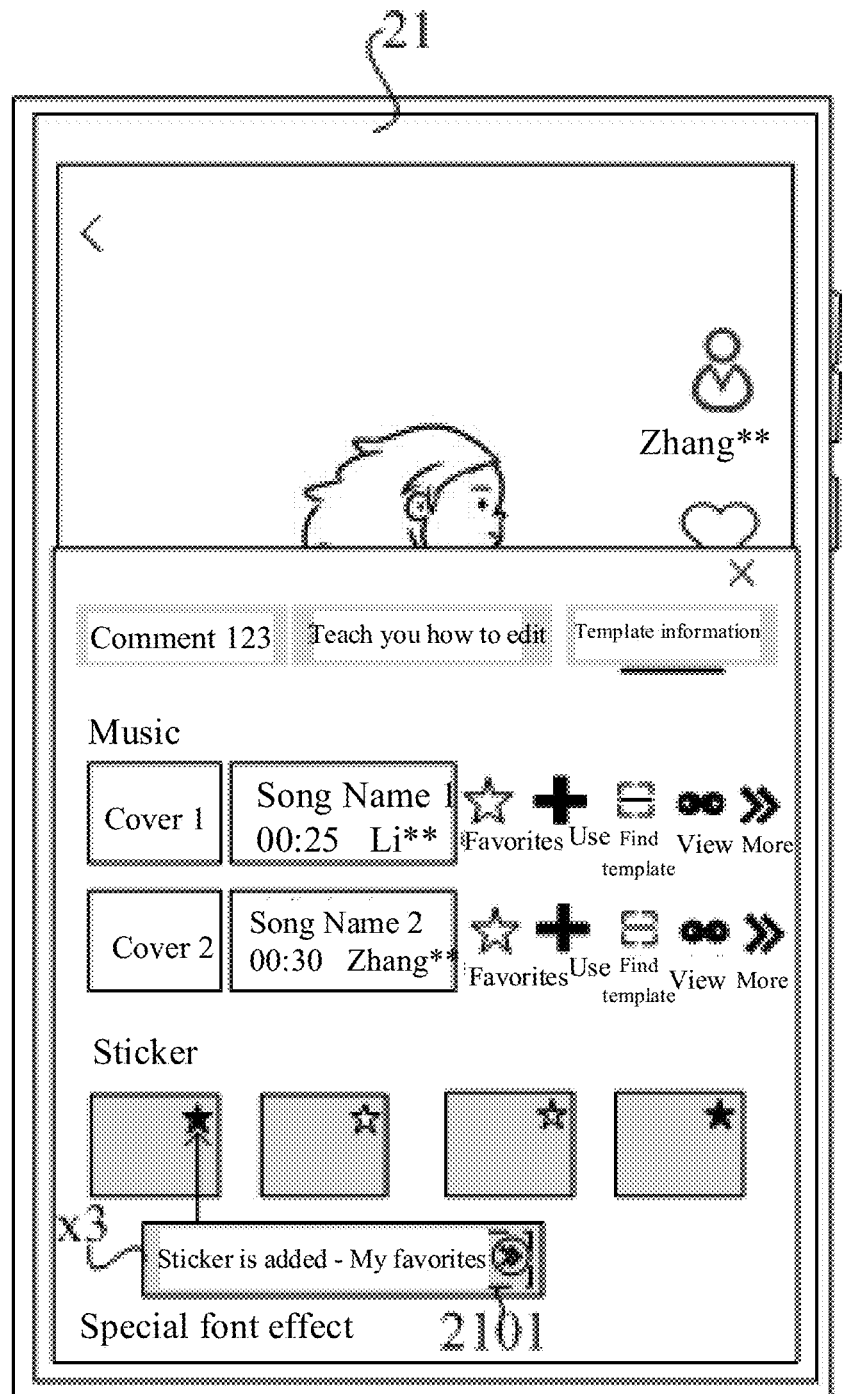
FIGS. 5a to 5f are schematic diagrams of human-computer interaction interfaces provided by still another embodiment of the present disclosure.

When application 1 detects an operation (such as a click operation) on the favorite control b1 corresponding to the sticker 1 shown in FIG. 3(b), application 1 exemplarily displays a user interface as shown in FIG. 5a on the mobile phone. In the user interface 21 shown in FIG. 5a, the favorite control b1 corresponding to sticker 1 is in the second state. The other sticker materials remain in the same state as before.

In the user interface 21 shown in FIG. 5a, a prompt window x3 can be displayed for the sticker 1, wherein prompt information that sticker 1 has been added to the sticker favorite list can be displayed in the prompt window x3. In the user interface 21 shown in FIG. 5a, "Added to Stickers—My Favorites" is shown in the prompt window x3, as an example.

Optionally, the prompt window x3 may further comprise a control 2101 for entering a second guide window x4. The second guide window x4 is configured to play a sticker viewing guide video, and display other prompt information.

Figure 5B:

For example, when application 1 detects a user operation (such as a click operation) on the control 2101 shown in FIG. 5a, application 1 may exemplarily display a user interface 22 as shown in FIG. 5b on the mobile phone. As shown in FIG. 5b, an upper portion of the first guide window x4 is configured to play the sticker viewing guide video. A lower portion of the second guide window x4 is configured to display prompt information such as "How to view my favorite stickers? Stickers are collected in Edit—Stickers—My Favorites; Why do I collect stickers? Collect your favorite stickers as you browse. In video editing, you can open the sticker bar to see and use your favorite stickers." The second guide window x4 also comprises a control 2201, wherein the control 2201 is configured to close the second guide window x4.

Figure 5C:
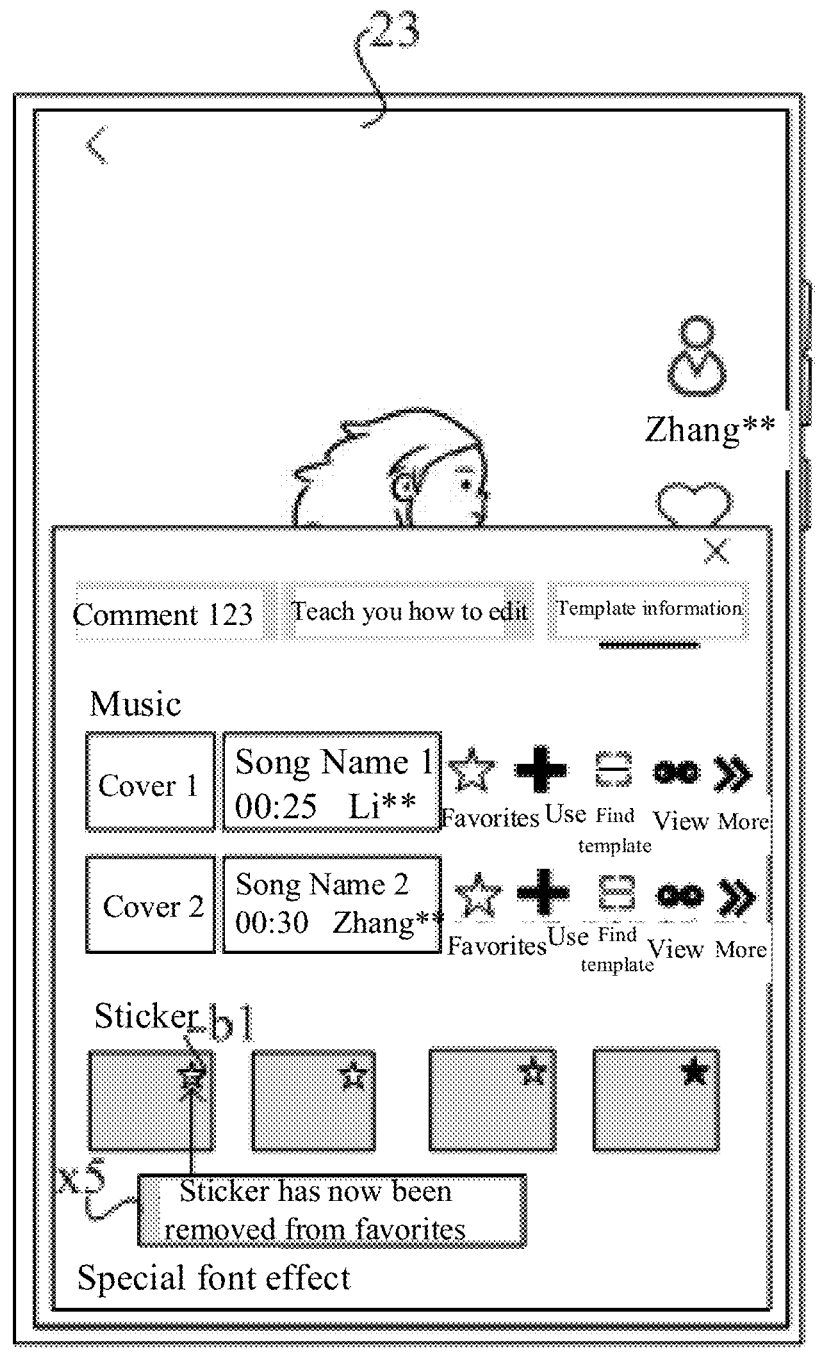

When application 1 detects a user operation (such as a click operation) on the control 2201 shown in FIG. 5b, application 1 may exemplarily display a user interface 23 as shown in FIG. 5c on the mobile phone. Referring to the user interface 23 shown in FIG. 5c, a prompt window x5 can display prompt information about canceling a favorite. For example, in the user interface 23, "This sticker has been canceled from the Favorites" is displayed in the prompt window x5. In addition, the favorite control b1 corresponding to sticker 1 is updated to the first state.

Further, when application 1 receives an operation (such as a click operation) on the favorite control b1 corresponding to sticker 1 again in the user interface 23 shown in FIG. 5c, application 1 exemplarily displays a user interface as shown in FIG. 3(b) on the mobile phone. That is to say, when the user performs an operation on the favorite control b1 corresponding to the sticker 1 several times in succession, the display can be switched between the user interface shown in FIG. 3(b) and the user interface shown in FIG. 5c.

Figure 5D:
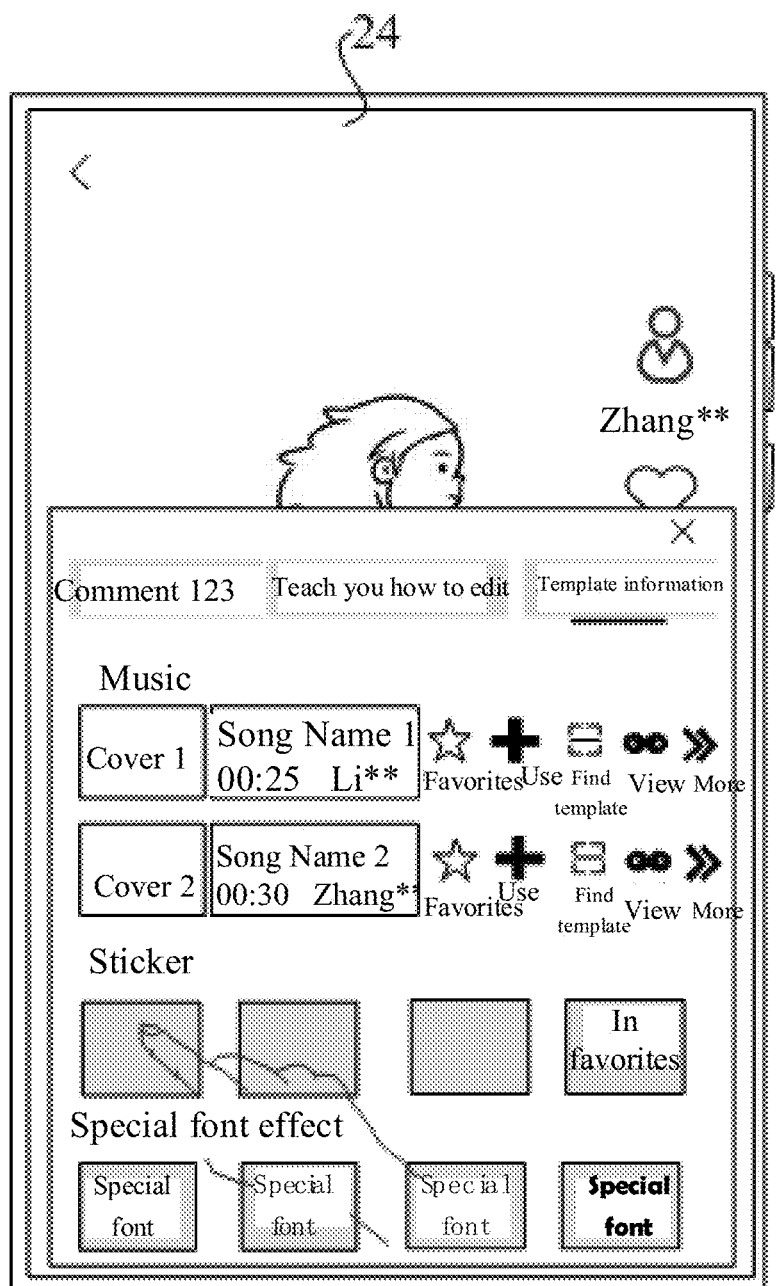

In another implementation, in user interface 24 shown in FIG. 5d, favorite controls b1 corresponding to various stickers are all in a hidden state. In addition, if the current sticker has not been added to the sticker favorite list, no favorite state information is displayed in a display area corresponding to the sticker. If the current sticker has been added to the sticker favorite list, favorite state information may be displayed in a display area corresponding to the sticker. As shown in FIG. 5d, for sticker 1 that is not in the Favorites, no favorite state information is displayed; for sticker 2 that is in the Favorites, "In Favorites" is displayed on its upper left corner.

Figure 5E:
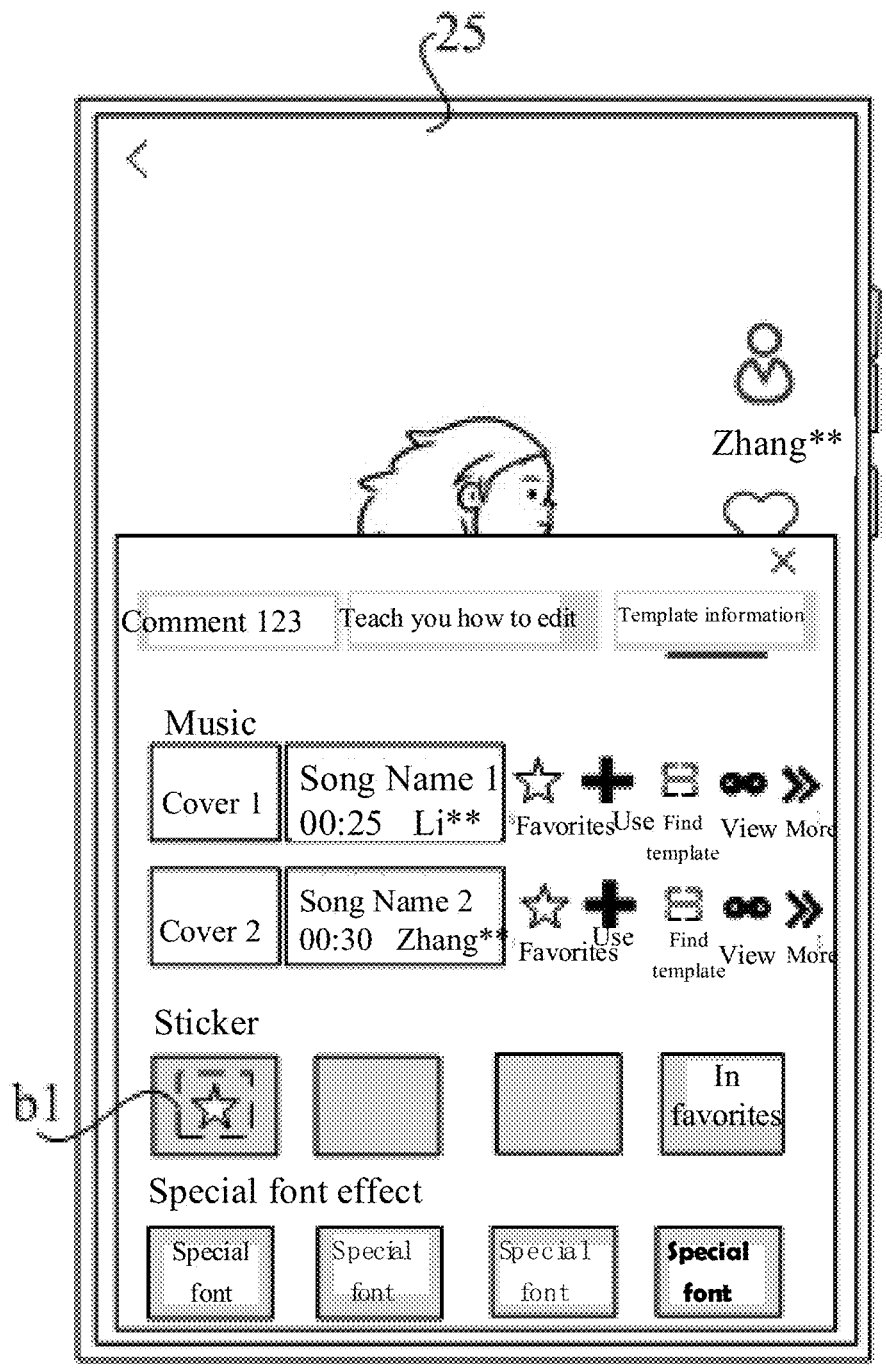

When application 1 detects a user operation (such as a click operation) at any position in the sub-display area 1205 corresponding to the sticker 1 in the user interface shown in FIG. 5d, application 1 exemplarily displays a user interface 25 as shown in FIG. 5e on the mobile phone. In the user interface 25 shown in FIG. 5e, application 1 displays the favorite control b1 corresponding to the sticker 1 in the sub-display area 1205 corresponding to the sticker 1. Further, in the user interface 25 shown in FIG. 5e, the favorite control b1 corresponding to the sticker 1 is in the first state, i.e., the "Not in Favorites" state.

Figure 5F:
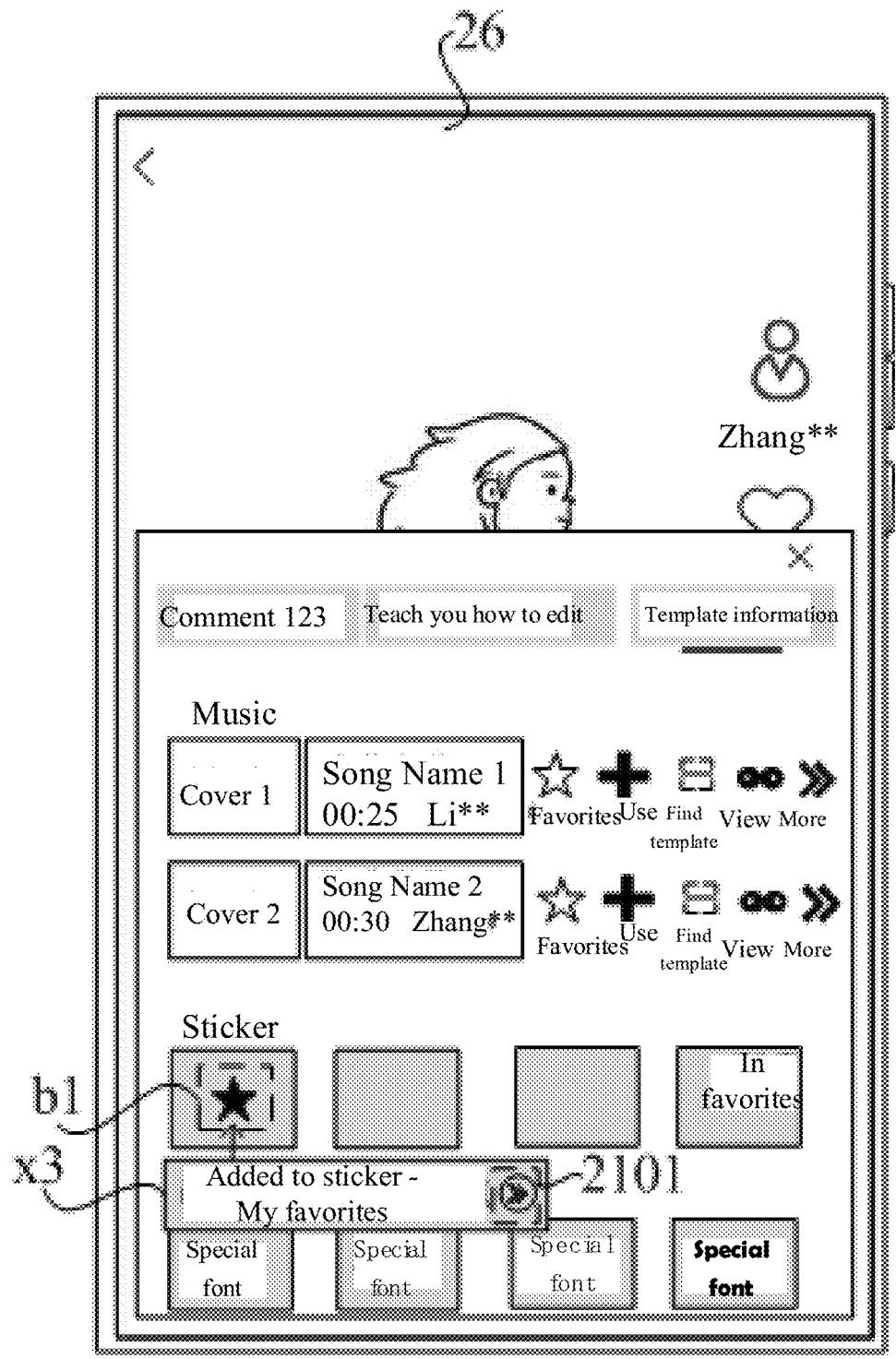

When application 1 detects a user-input operation (such as a click operation) on the control a5 in the user interface 25 shown in FIG. 5e, application 1 may exemplarily display a user interface 26 as shown in FIG. 5f on the mobile phone. In the user interface 26 shown in FIG. 5f, the favorite control b1 corresponding to the sticker 1 is in the second state, i.e., the "Exist in Favorites" state.

The user interface 26 shown in FIG. 5f further comprises a prompt window x3. For the specific introduction of the prompt window x3, reference can be made to the above description, which will not be repeated here.

If there are other functions for a sticker, such as use, share, etc., a control for a corresponding function can also be provided in the display area corresponding to the sticker. When the user operates a corresponding control, application 1 can execute a process of the corresponding function.

The above human-machine interaction interfaces provided in FIGS. 5a to 5f illustrate the scenario of operations on controls corresponding to sticker 1 (a target material described above) on the information display page corresponding to a target template video.

The implementation of the user input for the controls corresponding to the other stickers is similar to the implementation of the user input for the individual controls of sticker 1 and will not be repeated here.

3. Special Font Effect

In the information display page, the implementation of the special font effect is similar to the implementation of the sticker, and reference can be made to the description of the sticker above for details.

Of course, when a special font material in the special font effect is operated, the special font material is the target material mentioned above.

4. Special Effect

Referring to the information display page shown in FIG. 3(b), three special effect materials, namely special effect 1, special effect 2, special effect 3, are utilized by the first editing template, wherein the special effect 1 corresponds to a sub-display area 1209, the special effect 2 corresponds to a sub-display area 1210, and the special effect 3 corresponds to a sub-display area 1211. According to the chronological order in which the various special effect materials are added by the first editing template, positions of sub-display areas 1209 to 1211 are arranged from left to right on the information display page as shown in FIG. 3(b).

In practical applications, if more other special effect materials are used by a target template, the special effect materials can be arranged in the information display page from left to right or from top to bottom in the chronological order in which the special effect materials are added by the first editing template.

The sub-display area corresponding to each special effect material is configured to provide relevant information of the special effect material, such as the name of the special effect material, cover information, a favorite control c1, a use control c2, a search control c3, a control c4 corresponding to link, a control c5, etc.

In some possible implementations, the various controls corresponding to a special effect material can be a hidden state. When application 1 receives a user operation at any position in the sub-display area corresponding to the special effect, the controls corresponding to the special effect material are displayed on the user interface. Of course, some controls can also be directly displayed on the information display page according to actual needs.

For the special effect, an introduction will be given below with an example in which the favorite control c1, the use control c2, the search control c3, the control c4 corresponding to link, and the control c5 corresponding to special effect 1 are operated respectively.

(a) Favorite Control c1

The favorite control c1 is configured to add the special effect 1 to the special effect favorite list. If the current special effect 1 has not been added by the user to the special effect favorite list, the favorite control c1 is displayed in a "Not in Favorites" state (i.e., a first state).

Figure 6A:
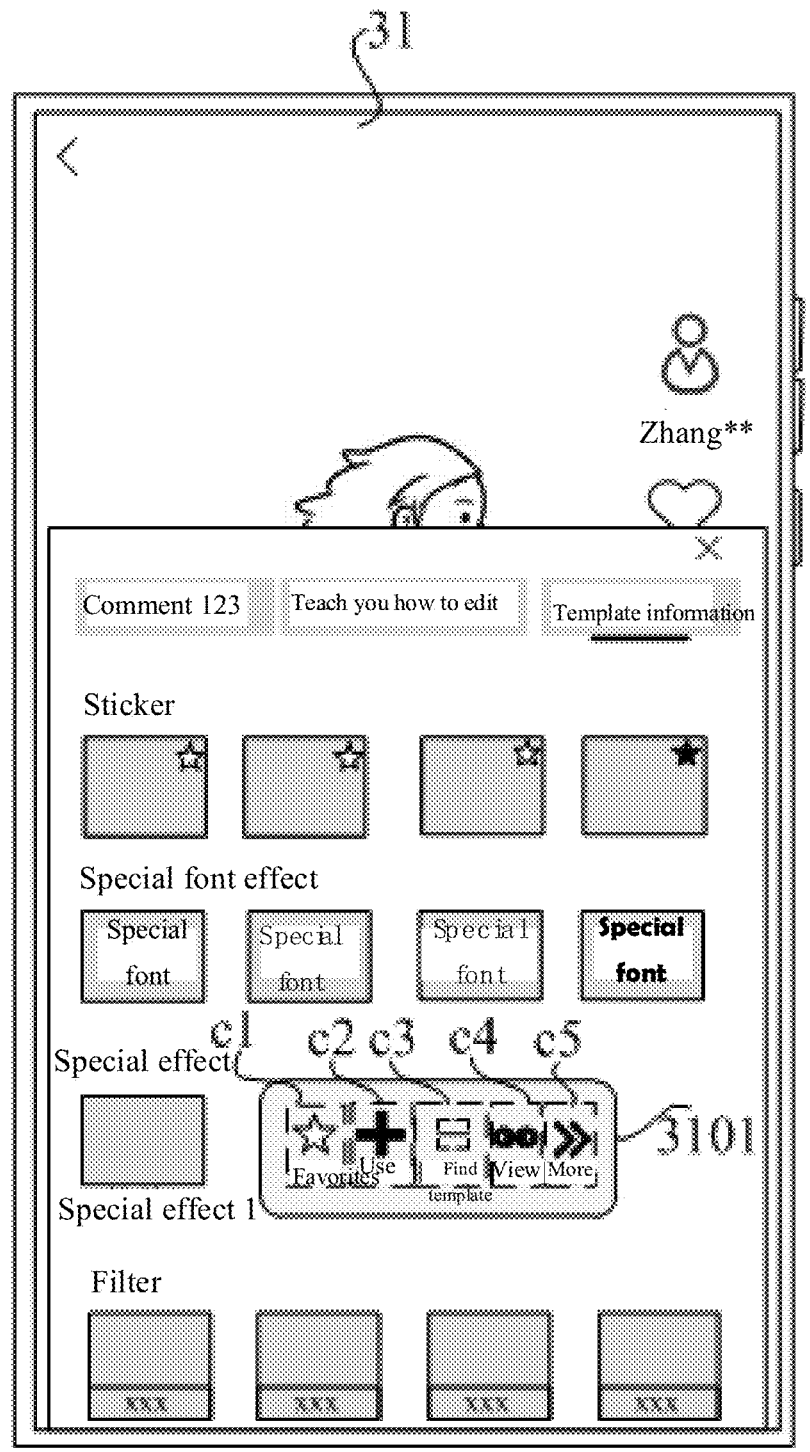
FIGS. 6a to 6e are schematic diagrams of human-computer interaction interfaces provided by a further embodiment of the present disclosure.

For example, assuming that the controls corresponding to special effect 1 are in a hidden state, when application 1 detects a user operation (such as a click operation) on any position of the sub-display area corresponding to special effect 1 shown in FIG. 3(b), application 1 can exemplarily display an area 3101 in user interface 31 as shown in FIG. 6a on the mobile phone, the area 3101 comprising various controls corresponding to the special effect 1.

When application 1 detects an operation (such as a click operation) on the favorite control c1 in area 3101, application 1 may exemplarily display a user interface 32 as shown in FIG. 6a on the mobile phone. In the user interface 31 shown in FIG. 6a, the favorite control c1 is in the first state, indicating that special effect 1 is not currently in the special effect favorite list; the favorite control c1 is in the second state (it can be considered as an "In Favorites" state) in the user interface 31 shown in FIG. 6b, indicating that special effect 1 is currently in the special effect favorite list.

Figure 6B:
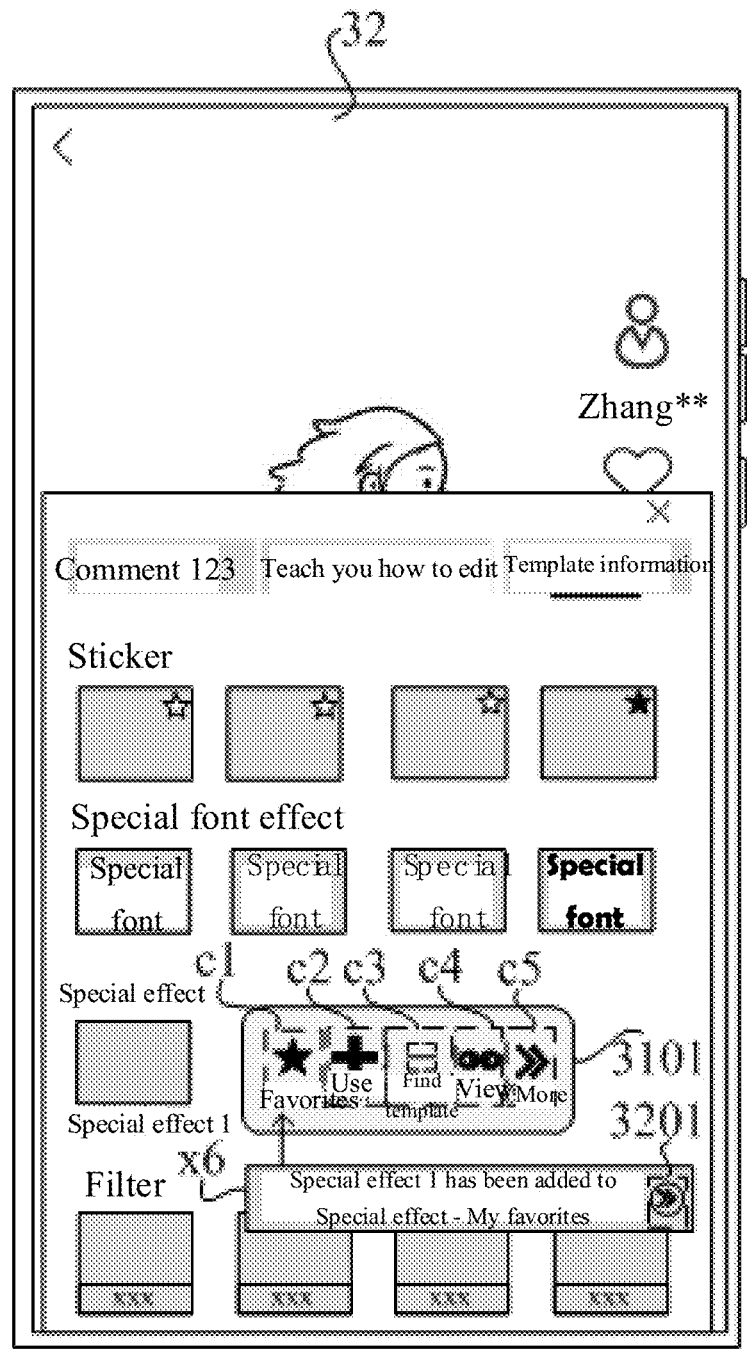

In some cases, the user interface 32 shown in FIG. 6b may further comprise a window x6, wherein the window x6 is configured to display prompt information that the special effect 1 has been added to the special effect favorite list. Referring to the user interface shown in FIG. 6a, text "Special effect 1 has been added to the special effect favorite" is displayed in the window x6.

Optionally, the prompt window x6 may also comprise a control 3201 for entering a third guide window x7. The third guide window x7 is configured to play a special effect viewing guide video, and display other prompt information.

Figure 6C:
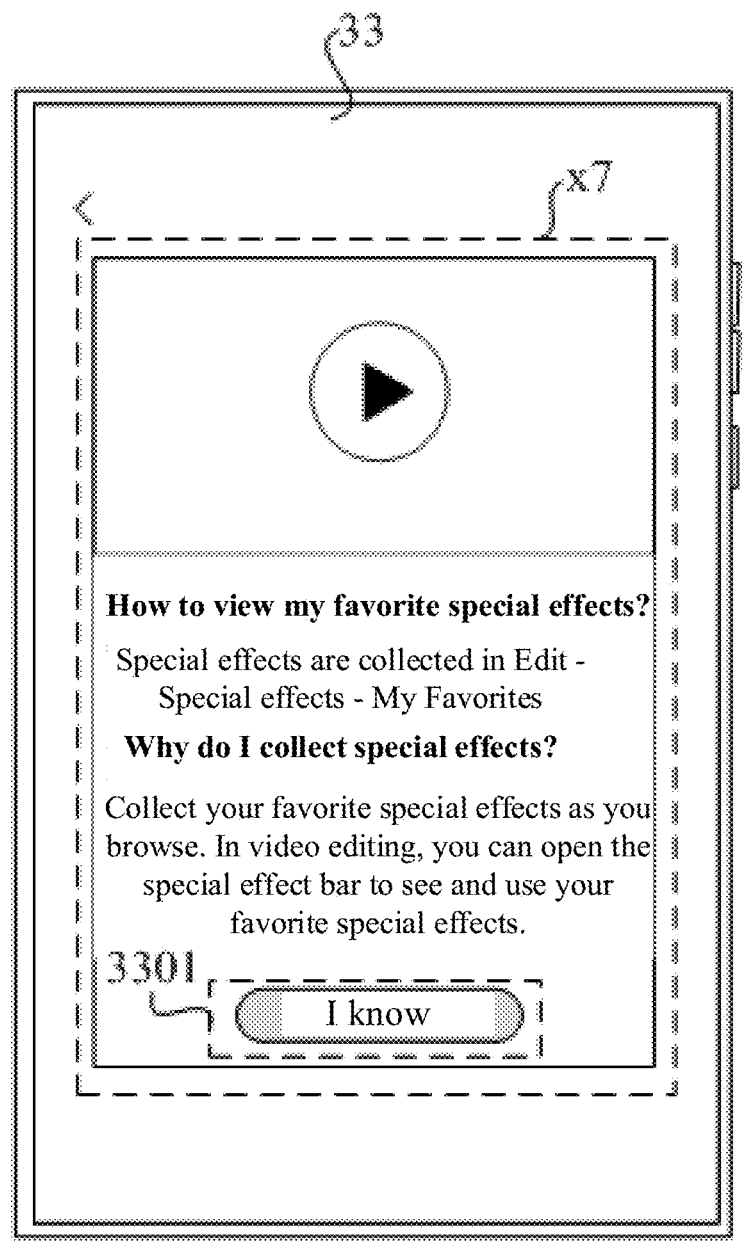

For example, when application 1 detects an operation (such as a click operation) on the control 3201 shown in FIG. 6a, application 1 may exemplarily display a user interface 33 as shown in FIG. 6c on the mobile phone. As shown in FIG. 6c, an upper portion of the third guide window x7 is configured to play a special effect viewing guide video. A lower portion of the third guide window x7 is configured to display prompt information such as "How to view my favorite special effects? Special effects are collected in Edit—Special effects—My Favorites; Why do I collect special effects? Collect your favorite special effects as you browse. In video editing, you can open the special effect bar to see and use your favorite special effects." The third guide window x7 also comprises a control 3301, wherein the control 3301 is configured to close the third guide window x7. When application 1 detects a user-input operation (such as a click operation) on the control 3301 shown in FIG. 6c, application 1 may return to the user interface shown in FIG. 6b.

(b) Use Control c2

The use control c2 is configured to create a target editing project based on the special effect 1. When application 1 detects an operation (such as a click operation) on the use control c2 in the user interface 31 shown in FIG. 6a, application 1 creates a target editing project in which the special effect 1 has been added.

Further, application 1 can exemplarily display a user interface 16 shown in FIG. 4c on the mobile phone, wherein the user interface 16 is configured to display videos and/or photos already captured by the mobile phone, and to provide an entry point for the selected videos and/or photos in video creation. An option 1601 and a control 1602 are displayed in the user interface 16. The option 1601 is configured to display a cover or photo of a video. The control 1602 is configured to provide an entry to a video editing page corresponding to the target editing project.

When an operation on the option 1601 (such as a click operation) in the user interface 16 shown in FIG. 4c is detected by application 1, the selected multimedia materials (i.e., the selected photos and/or videos) are added to the target editing project by application 1. When application 1 detects an operation (such as a click operation) on the control 1602, application 1 may display a video creation page in the exemplary user interface 17 as shown in FIG. 4d on the mobile phone.

(c) Search Control c3

The search control c3 is configured to generate a search task based on the special effect 1. When application 1 detects a user operation (such as a click operation) on the search control c3, application 1 sends a search request to a server device via the mobile phone. The search request can comprise relevant information of the special effect 1, so that the server device can search in a template video library based on the search request. Then, the server device sends data of a fourth multimedia material (also known as a same-style template video) that meets the search request to the mobile phone. The fourth multimedia material here is a multimedia material obtained by editing using special effect 1.

Figure 6D:
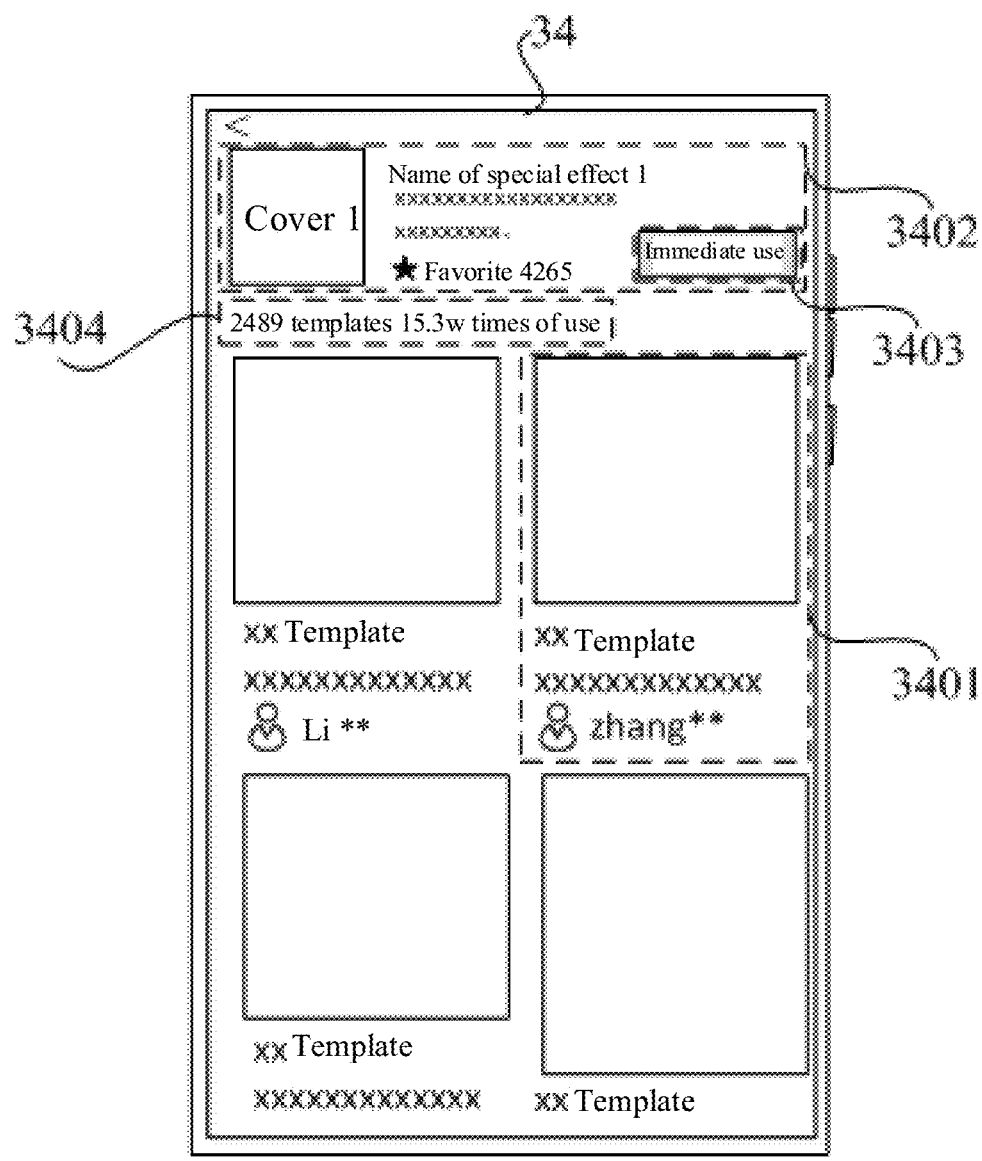

After receiving data of the same-style template video in which special effect 1 is utilized, application 1 can exemplarily display a user interface 34 shown in FIG. 6d on the mobile phone, wherein the user interface 34 is configured to display the same-style template video in which special effect 1 is utilized. If there are multiple same-style template vides that adopt special effect 1, each same-style template video can correspond to an area 3401, which is configured to provide relevant information of the same-style template video, such as a cover of the same-style template video, a theme of the same-style template video, an introduction to the same-style template video, the amount of use of the same-style template video, the number of likes the template video has received, and an avatar of the creator of the same-style template video.

The user interface 34 shown in FIG. 6d may further comprise an area 3402, wherein the area 3402 is configured to provide relevant information of the special effect 1, such as a cover of the special effect 1, the name of the special effect 1, an introduction to the special effect 1, and the number of times special effect 1 has been added to Favorites, etc.

The user interface 34 shown in FIG. 6d may further comprise a control 3403. The control 3403 is configured to enter a video creation page based on the special effect 1. For example, when application 1 detects a user-input operation (such as a click operation) on the control 3403, application 1 may exemplarily display a user interface shown in FIG. 4c on the mobile phone.

The user interface 34 shown in FIG. 6d may further comprise an area 3404, wherein the area 3404 is configured to display information of a search result, for example, the number of found same style template videos and the number of times special effect 1 has been utilized, etc.

(d) Control c4 Corresponding to Link

As shown in FIG. 6b, when application 1 detects an operation (such as a click operation) on the control c4, application 1 can jump to a web page corresponding to the link, and display content of the web page on the mobile phone.

(e) Control c5

Control c5 is configured to implement a "More" function. Specifically, if there are more functions corresponding to the special effect 1, for example, in addition to favorites, use, search, and link described above, special effect 1 can also be shared. Application 1 can display controls corresponding to some functions in the information display page and hide the other controls. Therefore, some of the controls can be hidden or shown using control c5.

Figure 6E:
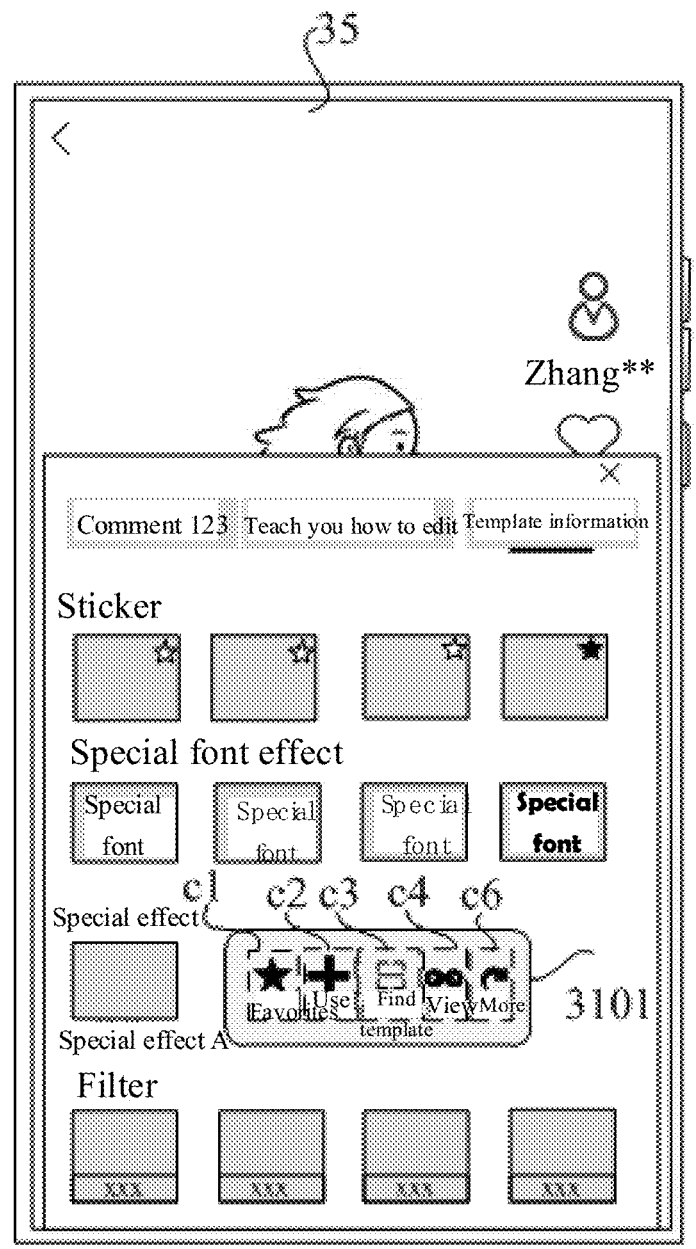

Specifically, when application 1 detects an operation (such as a click operation) on the control c5, application 1 may exemplarily display a user interface 35 as shown in FIG. 6e on the mobile phone.

The user interface 35 as shown in FIG. 6e displays controls corresponding to more special effect 1, such as a control c6, wherein the control c6 is configured to share the special effect 1.

The above human-machine interaction interfaces provided in FIGS. 6a to 6e illustrate the scenario of operations on a sub-display area, as well as some controls in the sub-display area, corresponding to the special effect 1 (the special effect 1 being a target material described above) on the information display page corresponding to a target template video.

Implementations of user operations on the various controls of the special effect 2 and the special effect 3 are similar to implementations of user operations on the various controls of the special effect 1, and will not be repeated here for the sake of simplicity.

5. Filter

In the information display page, the implementation of the filter is similar to the implementation of the special effect, and reference can be made to the description of the special effect above for details.

Of course, when a filter material in the filter is operated, that filter material is the target material mentioned above.

It should be noted that in the target editing mode used by the first editing template, a user may not currently have unlocked permissions for certain editing materials. In this case, if the user clicks on a use control corresponding to the editing material, a target editing project cannot be directly created. In this case, if the application determines that the current user's permission for the editing material has not been unlocked, a permission unlock interface can be displayed. Based on the user's operation in the permission unlock interface, the user's permission for the editing material can be updated to the unlocked state; thereafter, the application can create the target editing project for video creation.

Figure 7:
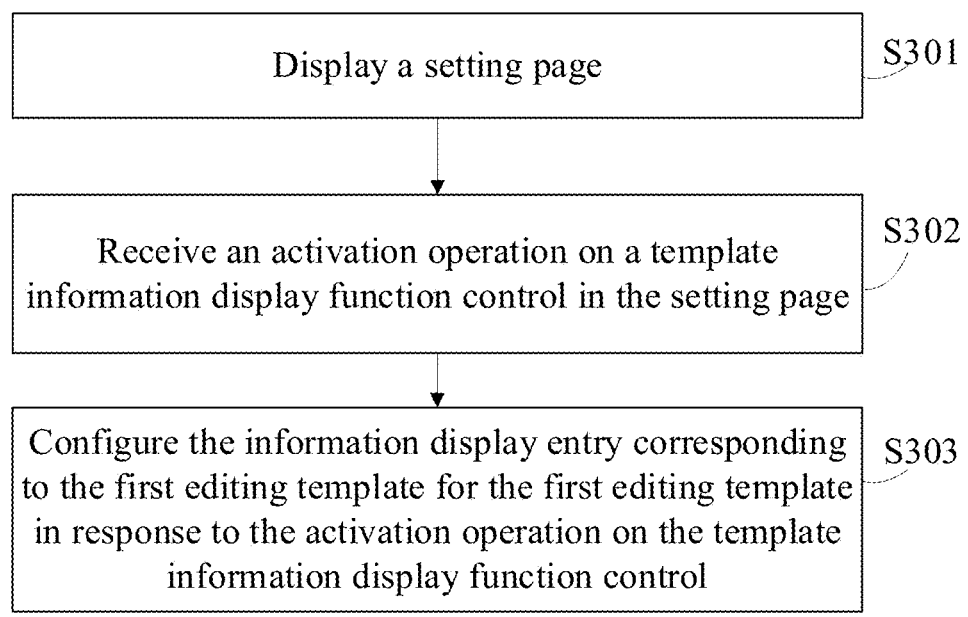
FIG. 7 is a flowchart of a display method provided by another embodiment of the present disclosure.

FIG. 7 is a flowchart of a display method provided by another embodiment of the present disclosure. As shown in FIG. 7, the method of the embodiment comprises steps S301 to S303.

In S301, a setting page is displayed.

In S302, an activation operation on a template information display function control in the setting page is received.

In S303, the information display entry corresponding to the first editing template is configured for the first editing template in response to the activation operation on the template information display function control.

The template information display function control is configured to enable or disable the template information display function. Specifically, when the template information display function control is activated, the template information display function is enabled; when the template information display function control is deactivated, the template information display function is disabled.

When the template information display function is enabled, the application can provide an information display page entry on a video playback page of the template video, and/or provide an icon corresponding to the information display page entry on a video information page of the template video.

In a possible implementation, the template information display function can be a permission configured by the creator of the editing template used for the template video for the editing template created by the creator.

Optionally, if the creator activates the template information display function, a corresponding information display page entry is provided for the editing template used in each video published by the creator.

Optionally, the creator can configure a template information display function control on a corresponding page when publishing a video. In this case, when the user activates the template information display function control, an corresponding information display page entry is only provided for the currently published video, thereby improving the flexibility of template information display.

In practical applications, the user permission for the template information display function can also be configured. That is to say, the creator can flexibly specify which users can see detailed information of the editing templates used in videos published by the creator.

For example, when the template information display function is enabled by the creator of the template video, all users can set the information display page entry via a template video playback page when the template video is played, and/or enter the information display page via the icon corresponding to the configured information display page entry in the video information page.

For example, when the template information display function is enabled by the creator of the template video, users who are friends of the creator can set the information display page entry via a template video playback page when the template video is played, and/or enter the information display page via the icon corresponding to the configured information display page entry in the video information page. Other users who are not friends of the creator cannot enter the information display page, but can normally play the template video.

For example, when the template information display function is enabled by the creator of the template video, some users specified by the creator can set the information display page entry via an template video playback page when the template video is played, and/or enter the information display page via the icon corresponding to the configured information display page entry in the video information page. Users other than those users specified by the creator cannot enter the information display page, but can normally play the template video.

It should be noted that in practical applications, after enabling the template information display function for a template video, which users are allowed to enter the information display page can be flexibly set according to actual needs. In the settings interface, corresponding permission setting options can be provided for selection by users.

In another possible implementation, the template information display function can be a permission that can be set by users other than the creator. If the template information display function is disabled by user A, even if the template information display function is enabled by creator B, when user A uses an application to play a video published by creator B, no information display entry of the editing template used by the video will be shown on the video playback page and/or the video information page.

Furthermore, a user can set permissions. For example, the user can choose for which users to enable the template information display function and for which users to disable the template information display function.

In this embodiment, by providing a template information display function control, users can easily enable or disable the template information display function through a simple operation. In addition, the user permission for entering the information display page can be flexibly set, thereby improving the flexibility of template information display management.

Optionally, the technical solution of the embodiment shown in FIG. 2 can be executed after S303.

Based on the above description, a detailed introduction to the display method provided in an embodiment of the present disclosure will be given with reference to FIGS. 8*a* to 8*e* and a specific application scenario. For the sake of illustration, in the illustration below, the electronic device is a mobile phone with an application (App 1) installed, for example. FIGS. 8*a* to 8*e* are schematic diagrams of human-computer interaction interfaces provided by a further embodiment of the present disclosure.

Figure 8A:
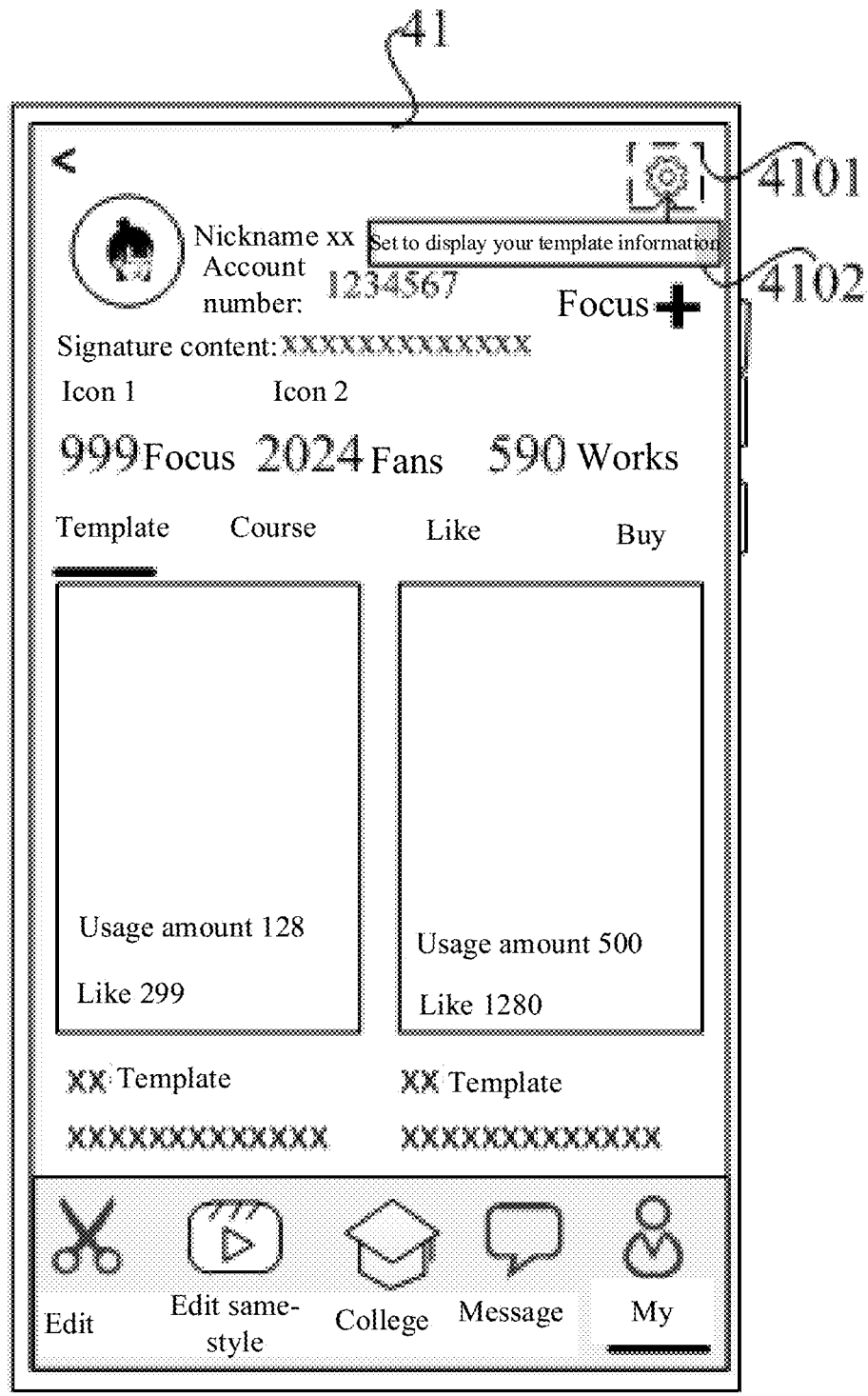
FIGS. 8a to 8f are schematic diagrams of human-computer interaction interfaces provided by a further embodiment of the present disclosure.

As shown in FIG. 8*a*, a user interface 41 shown in FIG. 8*a* is configured to display a personal information page, wherein the personal information page is configured to provide relevant information such as a user's avatar, work information, nickname, personal signature, etc.

In addition, the personal information page further comprises a control 4101, wherein the control 4101 is configured to enter a setting page. When application 1 detects that the template information display function control is currently deactivated and a user has entered the personal information page, application 1 can display a prompt window 4102 in the user interface shown in FIG. 8*a*. The prompt window 4102 is configured to display information that prompts to enable the template information display function, for example, "Set to display your template information".

Figure 8B:
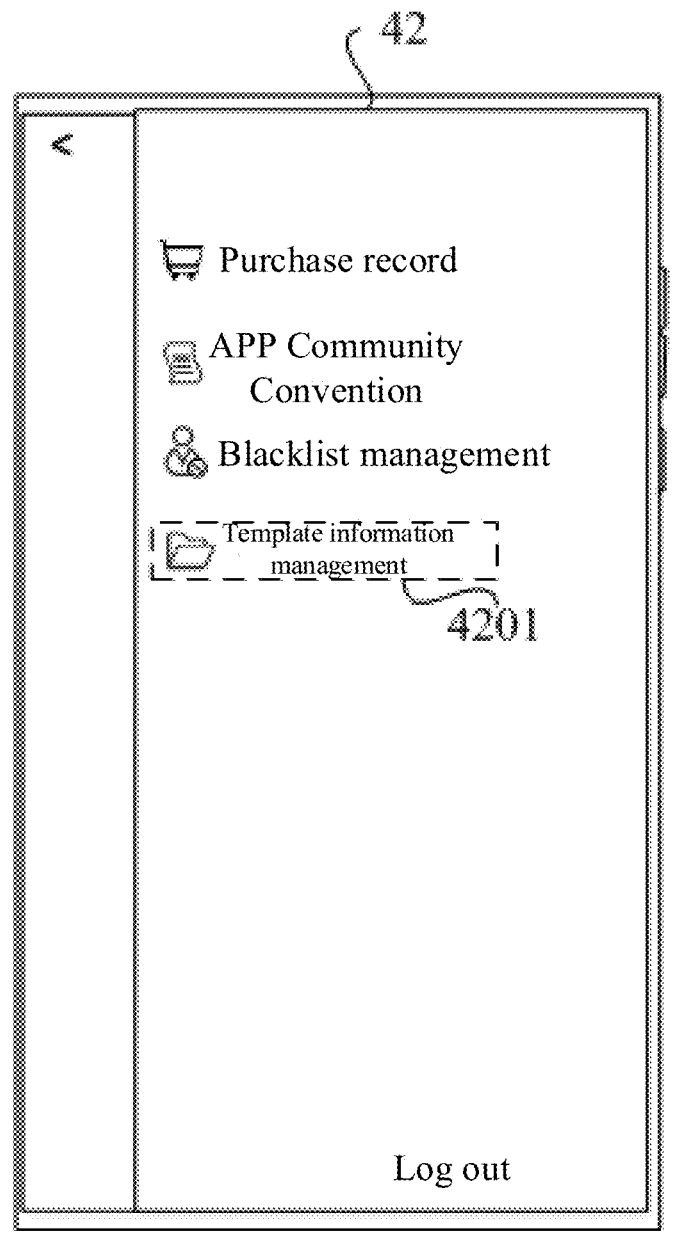

When application 1 detects an operation (such as a click operation) on the control 4101 shown in FIG. 8*a*, application 1 may exemplarily display a user interface 42 as shown in FIG. 8*b* on the mobile phone.

As shown in FIG. 8*b*, the user interface 42 shown in FIG. 8*b* is configured to display a settings page. The setting page may comprise a setting menu bar, wherein the setting menu bar comprises a template information management bar 4201.

Figure 8C:
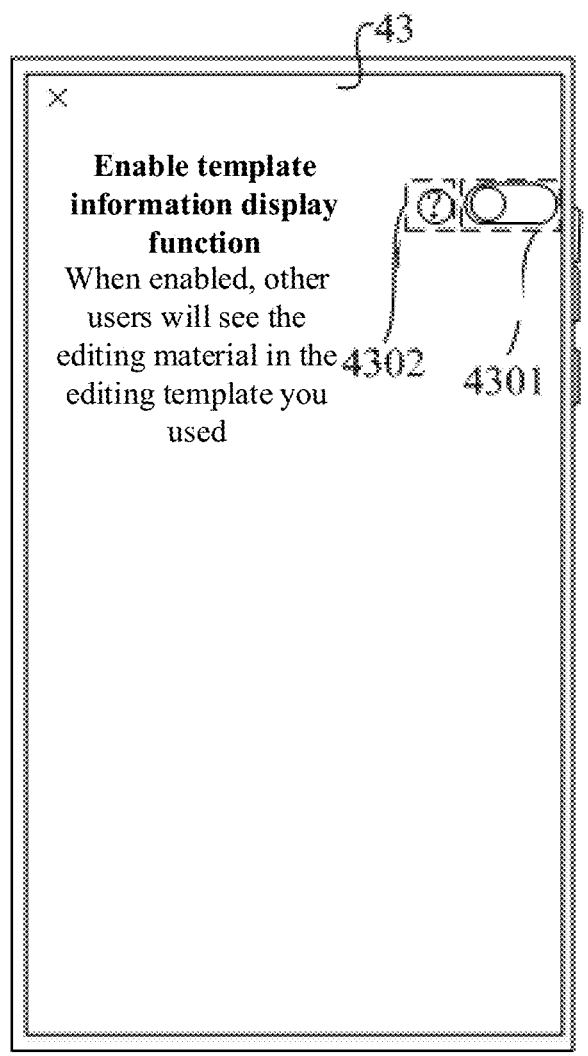

When application 1 detects an operation (such as a click operation) on the template information management bar 4201 shown in FIG. 8*b*, application 1 may exemplarily display a user interface 43 as shown in FIG. 8*c* on the mobile phone. Referring to FIG. 8*c*, the user interface 43 shown in FIG. 8*c* is configured to display a template information display function control 4301. In user interface 43 shown in FIG. 8*c*, the template information display function control 4301 is in a deactivated state. When application 1 detects an operation (such as a click operation) on the template information display function control 4301 shown in FIG. 8*c*, application 1 switches the template information display function control 4301 from the deactivated state to an activated state. Correspondingly, application 1 can exemplarily display a user interface 45 shown in FIG. 8*e* on the mobile phone. In the user interface shown in FIG. 8*e*, the template information display function control 4301 is in the activated state.

Optionally, the user interface 43 shown in FIG. 8*c* further comprises: a control 4302 for displaying a prompt window x8, wherein the prompt window x8 is configured to display relevant prompt information of template information display. When application 1 detects an operation (such as a click operation) on the control 4302, application 1 may exemplarily display a user interface 44 as shown in FIG. 8*d* on the mobile phone.

Alternatively, if the user interface 43 shown in FIG. 8*c* does not comprise the control 4302, after the template information display function control 4301 is activated for a preset duration, such as 0.5 seconds or 1 second, application 1 can display a prompt window x8 on the mobile phone.

Figure 8D:
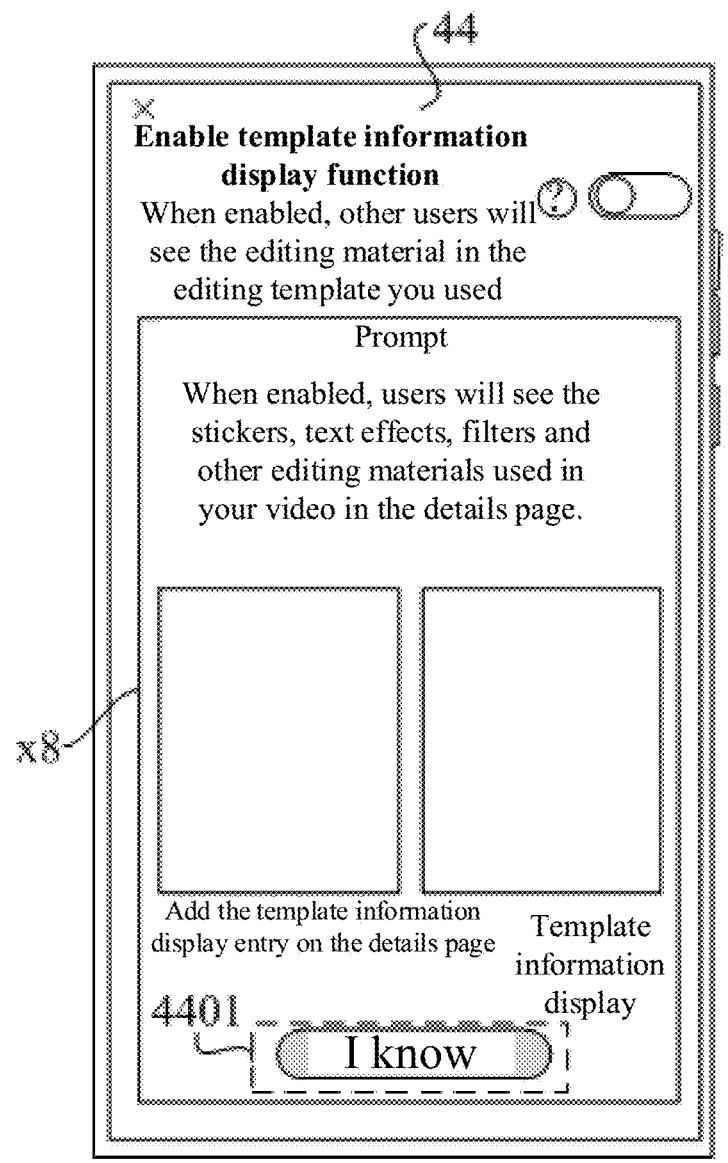

For example, the user interface 44 shown in FIG. 8*d* comprises a prompt window x8, wherein the prompt window x8 can prompt the user to enable the template information display function through text and images.

Figure 8E:
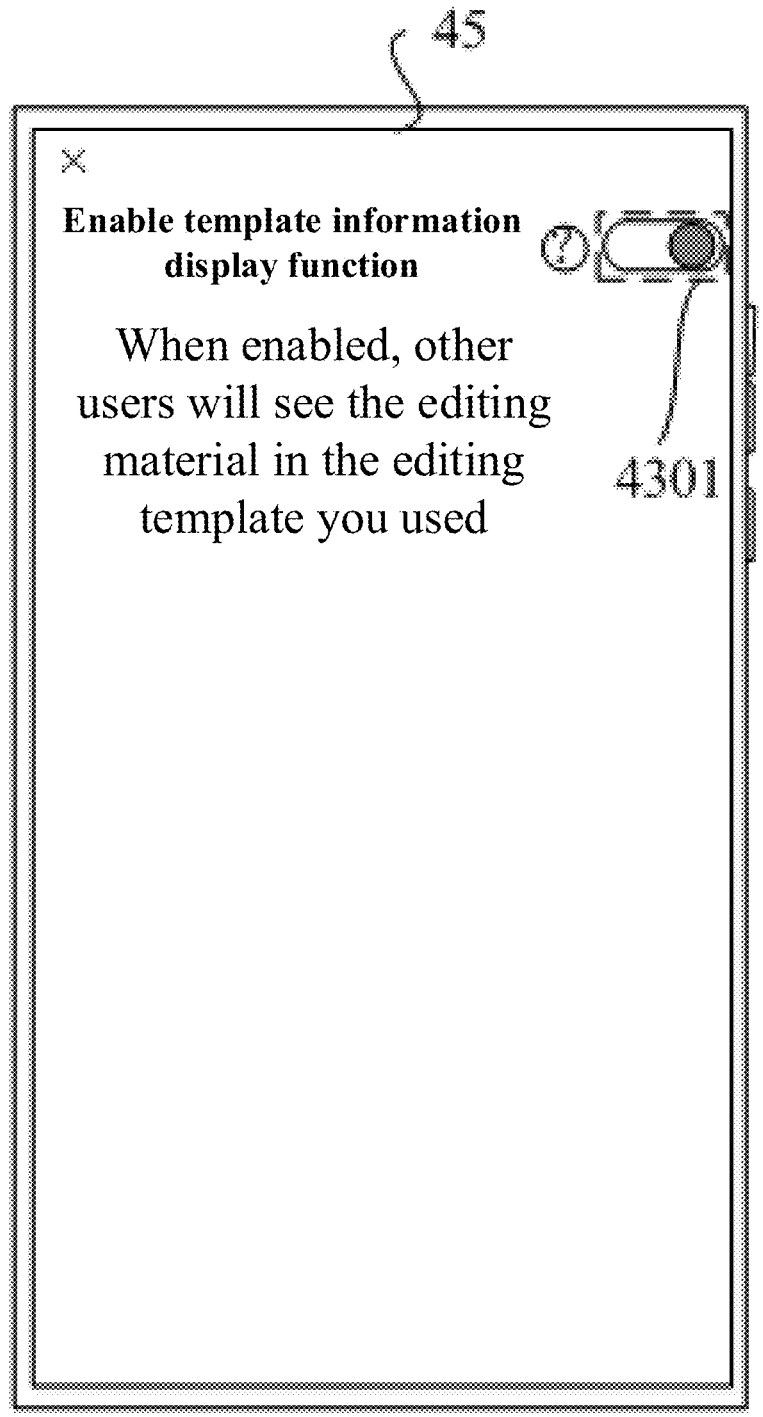

The user interface shown in FIG. 8*d* can also comprise a control 4401, the control 4401 is configured to close the prompt window x8. When application 1 detects a user-input operation (such as a click operation) on the control 4401 shown in FIG. 8*d*, application 1 may returns to the user interface 43 as shown in FIG. 8*c* or the user interface 45 as shown in FIG. 8*e* on the mobile phone.

Figure 8F:
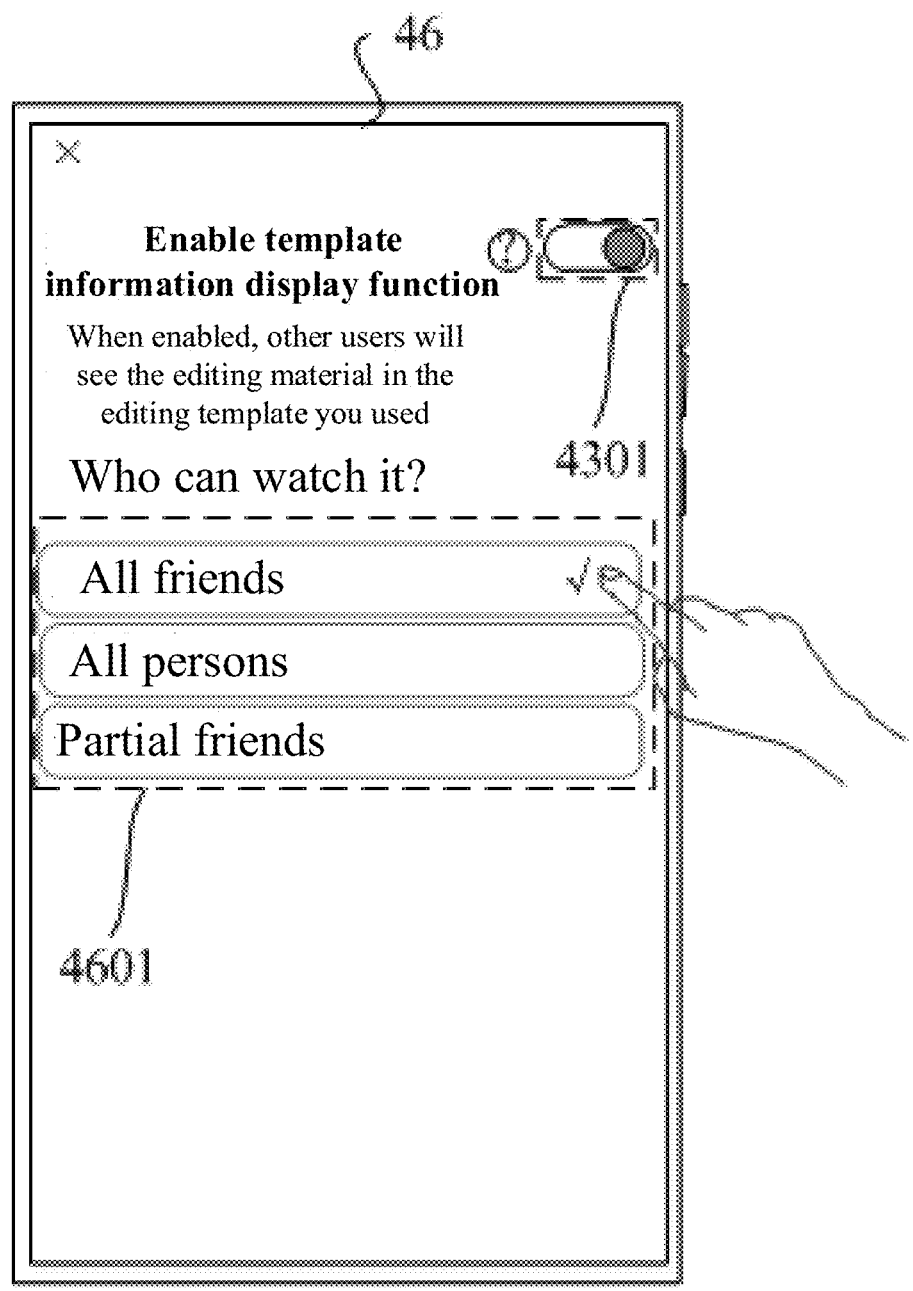

Optionally, in some cases, the user may configure a corresponding authorized user for the template information display function. Referring the user interface 46 shown in FIG. 8*f*, when application 1 detects an operation to activate the control 4301, application 1 may exemplarily display the user interface 46 as shown in FIG. 8*f* on the mobile phone. User interface 46 comprises a permission item 4601, wherein the user may configure authorized users corresponding to the template information display function by operating the user permission item 4601. For example, as shown in FIG. 8*f*, the user configures other users with whom he or she has a friend relationship to be able to see information about the editing templates used in the template videos that he or she publishes. This can improve the flexibility of template information display management.

Figure 9:
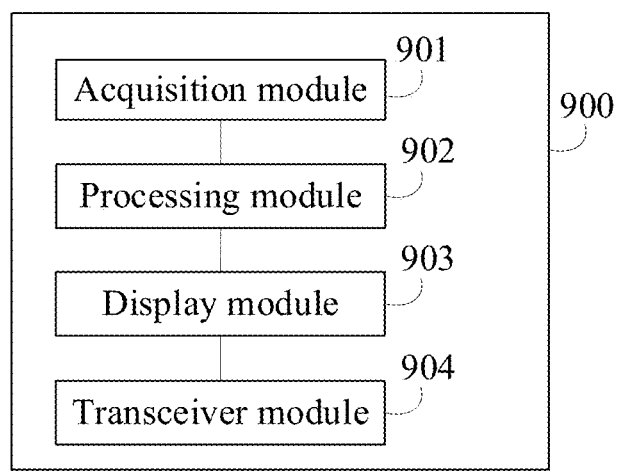
FIG. 9 is a schematic structural diagram of a display apparatus provided by an embodiment of the present disclosure.

FIG. 9 is a schematic structural diagram of a display apparatus provided by an embodiment of the present disclosure. As shown in FIG. 9, the display apparatus of the embodiment comprises an acquisition module 901 and a processing module 902.

The acquisition module 901 is configured to receive a user operation on an information display entry of a first editing template, wherein the first editing template is configured to edit a first multimedia material into a second multimedia material according to a target editing mode, and the target editing mode is an editing mode adopted by the first editing template.

The processing module 902 is configured to control a display module 903 to display an information display page of the first editing template according to the user operation on the is configured to display indication information of the target editing mode.

In some embodiments, the display apparatus 900 further comprises a display module 903. The display module 903 is configured to display or play a target template video, wherein the target template video is a third multimedia material conforming to the target editing mode.

The acquisition module 901 is configured to receive the user operation on the information display entry of the target template video.

In some embodiments, the acquisition module 901 is configured to receive the user operation on the information display entry in a video playback page corresponding to a target template video.

In some embodiments, the display module 903 is further configured to display a video information page corresponding to a target template video.

The acquisition module 901 is configured to receive the user operation on an icon corresponding to the information display entry in the video information page.

In some embodiments, the acquisition module 901 is further configured to receive a user operation on a favorite control corresponding to a target material in the information display page.

The processing module 902 is further configured to add the target material to a favorite list according to the user operation on the favorite control.

In some embodiments, the acquisition module 901 is further configured to receive a user operation on a search control corresponding to a target material in the information display page.

The processing module 902 is further configured to obtain and display a second editing template in response to the user operation on the search control, wherein the second editing template is configured to indicate editing according to the target material.

In some embodiments, the processing module 902 is configured to generate a search request according to the user operation on the search control, and send, via a transceiver module 904, the search request to a server device, wherein the search request is configured to request acquisition of the second editing template which utilizes the target material.

In some embodiments, the display apparatus 900 further comprises the transceiver module 904.

The transceiver module 904 is further configured to receive the second editing template sent by the server device.

The display module 903 is further configured to display the second editing template.

In some embodiments, the acquisition module 901 is further configured to receive a user operation on a use control corresponding to a target material in the information display page.

The processing module 902 is further configured to, in response to the user operation on the use control, create a target editing project and display a video editing page corresponding to the target editing project, wherein the target material is added to the target editing project.

In some embodiments, the target editing mode is displayed according to an editing mode category in the information display page.

In some embodiments, the target editing mode comprises one or more of: music, a sticker, a special font effect, a special effect, a filter, or an inspiration source.

In some embodiments, the display module 903 is further configured to display a setting page.

The acquisition module 901 is further configured to receive an activation operation on a template information display function control in the setting page.

The processing module 902 is further configured to configure the information display entry corresponding to the first editing template for the first editing template in response to the activation operation on the template information display function control.

In this embodiment, the transceiver module 904 can be a communication module with a wireless communication function or a wired communication function. The transceiver module 904 can be used to communicate with a server device.

The display apparatus provided in this embodiment can perform the technical solution provided in any of the above method embodiments, and its principle and technical effect are similar to that of the method embodiments, which can be described with reference to the description of the foregoing method embodiments, and will not be repeated herein.

Figure 10:
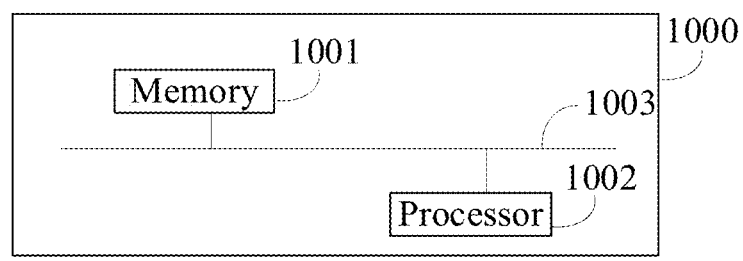
FIG. 10 is a schematic structural diagram of an electronic device provided by an embodiment of the present disclosure.

FIG. 10 is a schematic structural diagram of an electronic device provided by an embodiment of the present disclosure. As shown in FIG. 10, an electronic device 1000 provided by this embodiment comprises: a memory 1001 and a processor 1002.

The memory 1001 can be an independent physical unit and can be connected to the processor 1002 through a bus 1003. The memory 1001 and the processor 1002 can also be integrated together, implemented in hardware, etc.

The memory 1001 is configured to store program instructions, and the processor 1002 calls the program instructions to implement the technical solution of any one of the above method embodiments.

Optionally, when some or all of the methods in the above embodiments are implemented by software, the electronic device 1000 may comprise only a processor 1002. The memory 1001 used for storing programs is located outside the electronic device 1000, and the processor 1002 is connected to the memory through circuits/wires for reading and executing programs stored in the memory.

The processor 1002 can be a central processing unit (CPU), a network processor (NP), or a combination of CPU and NP.

The processor 1002 may further comprise a hardware chip. The above hardware chip may be an application specific integrated circuit (ASIC), a programmable logic devices (PLD), or a combination thereof. The above PLD may be a complex programmable logic device (CPLD), a field programmable gate array (FPGA), a general array logic (GAL), or any combination of thereof.

The memory 1001 may comprise a volatile memory, such as a random access memory (RAM). The memory may also comprise non-volatile memory, such as a flash memory, a hard disk drive (HDD), or a solid-state drive (SSD). The memory may also comprise a combination of any of the above types of memory.

An embodiment of the present disclosure further provides an electronic device, comprising: a memory, a processor and computer program instructions, wherein the memory is configured to store the computer program instructions, and the processor is configured to execute the computer program instructions to implement the display method described above.

An embodiment of the present disclosure further provides a computer-readable storage medium, comprising: a program that, when executed by at least one processor of an electronic device, implements the technical solution of any one of the above embodiments.

An embodiment of the present disclosure further provides a program product comprising a computer program stored in a readable storage medium, wherein at least one processor of the electronic device can read the computer program from the readable storage medium, and execute the computer program to cause the electronic device to implement the technical solution of any one of the above embodiments.

An embodiment of the present disclosure further provides a computer program product that, when running on an electronic device, causes the electronic device to implement the display method described above.

An embodiment of the present disclosure further provides a computer program, comprising: instructions that, when executed by a processor, cause the processor to perform the display method described above.

It should be noted that, in this description, the use of relational terms such as "first" and "second" and the like are used solely to distinguish one entity or action from another entity or action without necessarily requiring or implying any actual such relationship or order between such entities or actions. Further, terms "comprise", "include" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A display method, comprising:
  receiving a user operation on an information display entry of a first editing template, wherein the first editing template is configured to edit a first multimedia material into a second multimedia material according to a target editing mode, the target editing mode is an editing mode adopted by the first editing template, and the information display entry is named based on names of a plurality of materials used in the first editing template;
  displaying an information display page of the first editing template in response to the user operation on the information display entry, wherein the information display page is configured to aggregate and display indication information of the target editing mode, wherein the target editing mode comprises at least two editing modes of: music, a sticker, a special font effect, a special effect, or a filter, and each of the at least two editing modes uses a plurality of editing materials;
  displaying various target editing modes in descending order of priority, and in combination with a chronological order of editing materials added by the first editing template, determining a position of a sub-display area corresponding to each editing material of the editing materials in a display area of the target editing mode; and receiving a user operation on a search control corresponding to a target material in the information display page; and obtaining and displaying a second editing template in response to the user operation on the search control, wherein the second editing template is configured to indicate editing according to the target material, wherein in the information display page, each target editing mode of the at least two editing modes corresponds to the display area, wherein in the display area, the plurality of editing materials used for the each target editing mode are displayed, and the display area corresponding to the each target editing mode comprises the sub-display area corresponding to each of the plurality of editing materials adopted by the target editing mode, wherein the sub-display area is configured to display indication information of a corresponding editing material, and wherein the obtaining and displaying the second editing template in response to the user operation on the search control comprises:

sending a search request to a server device in response to the user operation on the search control, wherein the search request is configured to request acquisition of the second editing template which utilizes the target material; and receiving and displaying the second editing template sent by the server device.

2. The display method according to claim 1, wherein the receiving of the user operation on the information display entry of the first editing template comprises:

displaying or playing a target template video, wherein the target template video is a third multimedia material conforming to the target editing mode; and receiving the user operation on the information display entry of the target template video.

3. The display method according to claim 1, wherein the receiving of the user operation on the information display entry of the first editing template comprises:

receiving the user operation on the information display entry in a video playback page corresponding to a target template video.

4. The display method according to claim 1, wherein the receiving of the user operation on the information display entry of the first editing template comprises:

displaying a video information page corresponding to a target template video; and receiving the user operation on an icon corresponding to the information display entry in the video information page.

5. The display method according to claim 1, further comprising:

receiving a user operation on a favorite control corresponding to the target material in the information display page; and adding the target material to a favorite list in response to the user operation on the favorite control.

6. The display method according to claim 1, further comprising:

receiving a user operation on a use control corresponding to the target material in the information display page; and in response to the user operation on the use control, creating a target editing project and displaying a video editing page corresponding to the target editing project, wherein the target material is added to the target editing project.

7. The display method according to claim 1, wherein the target editing mode is displayed according to an editing mode category in the information display page.

8. The display method according to claim 1, further comprising:

displaying a setting page;

receiving an activation operation on a template information display function control in the setting page; and configuring the information display entry corresponding to the first editing template for the first editing template in response to the activation operation on the template information display function control.

9. An electronic device, comprising: a memory and a processor, wherein the memory is configured to store computer program instructions, the processor is configured to execute the computer program instructions to:

receive a user operation on an information display entry of a first editing template, wherein the first editing template is configured to edit a first multimedia material into a second multimedia material according to a target editing mode, the target editing mode is an editing mode adopted by the first editing template, and the information display entry is named based on names of a plurality of materials used in the first editing template;

display an information display page of the first editing template in response to the user operation on the information display entry, wherein the information display page is configured to aggregate and display indication information of the target editing mode, wherein the target editing mode comprises at least two editing modes of: music, a sticker, a special font effect, a special effect, or a filter, and each of the at least two editing modes uses a plurality of editing materials;

display various target editing modes in descending order of priority, and in combination with a chronological order of editing materials added by the first editing template, determine a position of a sub-display area corresponding to each editing material of the editing materials in a display area of the target editing mode; and receive a user operation on a search control corresponding to a target material in the information display page; and obtain and display a second editing template in response to the user operation on the search control, wherein the second editing template is configured to indicate editing according to the target material, in the information display page, each target editing mode of the at least two editing modes corresponds to the display area, in the display area, the plurality of editing materials used for the each target editing mode are displayed, and the display area corresponding to the each target editing mode comprises the sub-display area corresponding to each of the plurality of editing materials adopted by the target editing mode, the sub-display area is configured to display indication information of a corresponding editing material, and to obtain and display the second editing template in response to the user operation on the search control, the processor is configured to:
send a search request to a server device in response to the user operation on the search control, wherein the search request is configured to request acquisition of the second editing template which utilizes the target material; and
receive and display the second editing template sent by the server device.

10. A non-transitory readable storage medium, comprising a program that, when executed by at least one processor of an electronic device, causes the electronic device to:
receive a user operation on an information display entry of a first editing template, wherein the first editing template is configured to edit a first multimedia material into a second multimedia material according to a target editing mode, the target editing mode is an editing mode adopted by the first editing template, and the information display entry is named based on names of a plurality of materials used in the first editing template;
display an information display page of the first editing template in response to the user operation on the information display entry, wherein the information display page is configured to aggregate and display indication information of the target editing mode, wherein the target editing mode comprises at least two editing modes of: music, a sticker, a special font effect, a special effect, or a filter, and each of the at least two editing modes uses a plurality of editing materials;
display various target editing modes in descending order of priority, and in combination with a chronological order of editing materials added by the first editing template, determine a position of a sub-display area corresponding to each editing material of the editing materials in a display area of the target editing mode; and
receive a user operation on a search control corresponding to a target material in the information display page; and
obtain and display a second editing template in response to the user operation on the search control, wherein the second editing template is configured to indicate editing according to the target material,
wherein in the information display page, each target editing mode of the at least two editing modes corresponds to the display area,
wherein in the display area, the plurality of editing materials used for the each target editing mode are displayed, and the display area corresponding to the each target editing mode comprises the sub-display area corresponding to each of the plurality of editing materials adopted by the target editing mode,
wherein the sub-display area is configured to display indication information of a corresponding editing material, and
wherein, to obtain and display the second editing template in response to the user operation on the search control, the program causes the electronic device to:
send a search request to a server device in response to the user operation on the search control, wherein the search request is configured to request acquisition of the second editing template which utilizes the target material; and
receive and display the second editing template sent by the server device.

11. The electronic device according to claim 9, wherein the processor is configured to execute the computer program instructions to:
display or play a target template video, wherein the target template video is a third multimedia material conforming to the target editing mode; and
receive the user operation on the information display entry of the target template video.

12. The electronic device according to claim 9, wherein the processor is configured to execute the computer program instructions to receive the user operation on the information display entry in a video playback page corresponding to a target template video.

13. The electronic device according to claim 9, wherein the processor is configured to execute the computer program instructions to:
display a video information page corresponding to a target template video; and
receive the user operation on an icon corresponding to the information display entry in the video information page.

14. The electronic device according to claim 9, wherein the processor is further configured to execute the computer program instructions to:
receive a user operation on a favorite control corresponding to the target material in the information display page; and
add the target material to a favorite list in response to the user operation on the favorite control.

15. The non-transitory readable storage medium according to claim 10, wherein the program, when executed by the at least one processor of the electronic device, further causes the electronic device to:
display or play a target template video, wherein the target template video is a third multimedia material conforming to the target editing mode; and
receive the user operation on the information display entry of the target template video.

16. The non-transitory readable storage medium according to claim 10, wherein the program, when executed by the at least one processor of the electronic device, further causes the electronic device to receive the user operation on the information display entry in a video playback page corresponding to a target template video.

17. The non-transitory readable storage medium according to claim 10, wherein the program, when executed by the at least one processor of the electronic device, further causes the electronic device to:
display a video information page corresponding to a target template video; and
receive the user operation on an icon corresponding to the information display entry in the video information page.

* * * * *